(12) United States Patent
Watson et al.

(10) Patent No.: US 8,812,480 B1
(45) Date of Patent: Aug. 19, 2014

(54) TARGETED SEARCH SYSTEM WITH DE-OBFUSCATING FUNCTIONALITY

(75) Inventors: Greg Watson, Palo Alto, CA (US);
Cristian Estan, Sunnyvale, CA (US);
Mark Birman, Los Altos, CA (US);
Alexei Starovoitov, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 105 days.

(21) Appl. No.: 13/355,051

(22) Filed: Jan. 20, 2012

(51) Int. Cl.
*G06F 17/30* (2006.01)

(52) U.S. Cl.
USPC .......................................................... 707/710

(58) Field of Classification Search
CPC ................. G06F 17/30864; G06F 17/30867
USPC .......................................................... 707/710
See application file for complete search history.

(56) References Cited

U.S. PATENT DOCUMENTS

| | | | | |
|---|---|---|---|---|
| 6,094,665 A * | 7/2000 | Lyons et al. | ........... | 707/E17.115 |
| 6,745,161 B1 * | 6/2004 | Arnold et al. | ......... | 707/E17.074 |
| 7,114,128 B2 * | 9/2006 | Koppolu et al. | ...... | 707/E17.013 |
| 7,308,464 B2 * | 12/2007 | Nowitz et al. | .......... | 707/999.007 |
| 7,496,962 B2 * | 2/2009 | Roelker et al. | .................. | 726/23 |
| 7,539,032 B2 | 5/2009 | Ichiriu et al. | | |
| 2008/0162573 A1 * | 7/2008 | Eyal | ........................... | 707/104.1 |
| 2008/0270428 A1 * | 10/2008 | McNamara et al. | .......... | 707/100 |
| 2011/0051174 A1 * | 3/2011 | Hattori | .......................... | 707/708 |
| 2011/0066741 A1 * | 3/2011 | Hoefner et al. | ............... | 707/708 |
| 2012/0094642 A1 * | 4/2012 | Popperl et al. | ................ | 455/415 |
| 2012/0124372 A1 * | 5/2012 | Dilley et al. | .................. | 713/162 |
| 2012/0174224 A1 * | 7/2012 | Thomas et al. | ................. | 726/24 |

\* cited by examiner

*Primary Examiner* — Rehana Perveen
*Assistant Examiner* — Tifany Thuy Bui
(74) *Attorney, Agent, or Firm* — Sterne, Kessler, Goldstein & Fox P.L.L.C.

(57) ABSTRACT

A content search system for determining whether an input string matches one or more rules includes a parser, a rules database, and a search engine. The parser, which has an input to receive the input string, is to extract one or more selected portions of the input string to form a filtered input string, and is to generate a rule select signal in response to the selected portions of the input string. The rules database stores a plurality of sets of rules. The search engine is to compare the filtered input string with a selected set of rules selected in response to the rule select signal.

40 Claims, 18 Drawing Sheets

Token Programs

| Address | Instruction(s) |
|---------|----------------|
| T1 | I1(1): Assert MRST to indicate R1 match<br>I1(2): Set flag F1 |
| T2 | I2(1): If flag F1 is set, then set flag F2 |
| T3 | I3(1): If flag F2 is set, then assert MRST to indicate R2 match |
| T4 | I4(1): If flag F1 is set, then assert MRST to indicate R3 match |

610

Regular Expressions

R1 = ab
R2 = ab.*cd.*ef
R3 = ab.*cristian

Tokens

T1 = ab
T2 = cd
T3 = ef
T4 = cristian

FIG. 6

TARGETED SEARCH SYSTEM WITH DE-OBFUSCATING FUNCTIONALITY

TECHNICAL FIELD

This disclosure generally relates to content search systems, and specifically relates to a search system having selectively activated search engines.

BACKGROUND OF RELATED ART

Regular expression search operations are employed in various applications including, for example, intrusion detection systems (IDS), virus protections, policy-based routing functions, internet and text search operations, document comparisons, and so on, to locate one or more patterns in an input string of characters. A regular expression can simply be a word, a phrase or a string of characters. For example, a regular expression including the string "gauss" would match data containing gauss, gaussian, degauss, etc. More complex regular expressions include metacharacters that provide certain rules for performing the match. Some common metacharacters are the wildcard ".", the alternation symbol "|", and the character class symbol "[ ]." Regular expressions can also include quantifiers such as "*" to match 0 or more times, "+" to match 1 or more times, "?" to match 0 or 1 times, {n} to match exactly n times, {n,} to match at least n times, and {n,m} to match at least n times but no more than m times. For example, the regular expression "a.{2}b" will match any input string that includes the character "a" followed by exactly 2 instances of any character followed by the character "b" including, for example, the input strings "abbb," adgb," "a7yb," "aaab," and so on.

Content search systems typically include a rules database that stores a plurality of rules (e.g., patterns or regular expressions), and one or more search engines that compare the input string with the rules to determine what action should be taken. For example, when determining whether to allow a user access to a particular website using an HTTP protocol, the packet payload containing an HTTP request for the site is typically provided to the search engine and then the payload is searched for all the rules in the database to determine whether any matching rules are found. If a matching rule is found (e.g., indicating that the requested website is on a list of restricted sites), then the search system generates a result that indicates an appropriate action to be taken (e.g., deny access to the website).

For the above example, conventional search systems typically search large portions (if not all) of the payload for all the rules stored in the database to selectively restrict access, even though (1) only small portions of the payload are relevant to the particular search operation and/or (2) not all of the rules stored in the database directly pertain to the particular search operation. For the former, searching non-relevant portions of the payload can result not only in false matches (e.g., in which a field of the payload unrelated to restricting access matches one of the rules) but also in unnecessarily long search times. For the latter, loading and/or searching an input string for rules that are not relevant to the particular search operation undesirably consumes more search engine resources than necessary.

As the number of users and websites on a network (e.g., the Internet) increase, so does the number of rules to be searched by various network components. Indeed, the size and complexity of rules being searched in various networking applications continues to explode at a pace that increasingly strains the storage and search speed capacities of existing search engines. Thus, there is a need to develop search systems that can more efficiently perform regular expression search operations using fewer resources.

BRIEF DESCRIPTION OF THE DRAWINGS

The present embodiments are illustrated by way of example and not intended to be limited by the figures of the accompanying drawings, where:

FIG. 6 depicts illustrative search operations for several exemplary regular expressions using search systems configured in accordance with present embodiments;

Like reference numerals refer to corresponding parts throughout the drawing figures.

DETAILED DESCRIPTION

Figure 1:
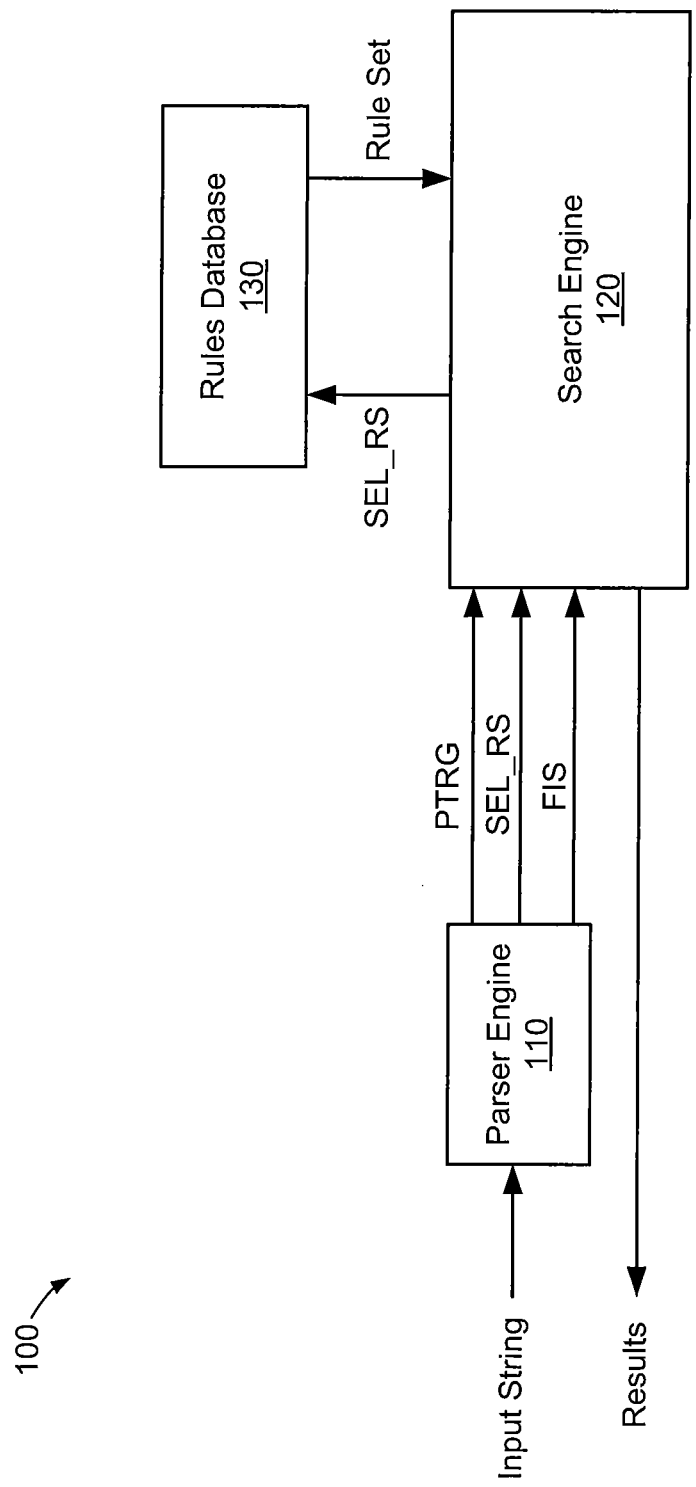
FIG. 1 shows a content search system in accordance with the present embodiments.

In the following description, numerous specific details are set forth such as examples of specific components, circuits, and processes to provide a thorough understanding of present embodiments. It will be apparent, however, to one skilled in the art that these specific details need not be employed to practice the present embodiments. In other instances, well known components or methods have not been described in detail in order to avoid unnecessarily obscuring the present embodiments. As used herein, the terms "rule" and "regular expression" refer to character strings of interest to be searched for in an input string during string search operations, and are thus interchangeable. The term "coupled" as used herein means connected directly to or connected through one or more intervening components or circuits. Any of the signals provided over various buses described herein may be time multiplexed with other signals and provided over one or more common buses. Additionally, the interconnection between circuit elements or blocks may be shown as buses or as single signal lines. Each of the buses may alternatively be single signal lines, and each of the single signal lines may alternatively be buses.

The present embodiments include various method steps, which will be described below. The steps may be performed by hardware components or may be embodied in machine-executable instructions, which can be used to cause hardware components (e.g., a processor or programming circuit) programmed with the instructions to perform the steps. Alternatively, the steps can be performed by a combination of hardware and software. Further, the steps and operations discussed herein (e.g., the loading of registers) can be performed either synchronously or asynchronously.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A content search system is disclosed herein that can implement regular expression search operations on a packet payload more efficiently than prior approaches by selectively extracting relevant portions of an input string contained in the payload to generate a filtered input string that can be more quickly searched than the original input string (e.g., because the filtered input string contains fewer characters than the original input string). Further, for some embodiments, the content search system can examine the packet payload (e.g., the input string) to determine what type of search operation is requested, and in response thereto can select a subset of the regular expression rules to be searched. Thus, the present embodiments can conserve limited resources of the search engine by searching only a subset of rules that are relevant to the requested search operation.

More specifically, the search system includes a parser engine, a search engine, and a rules database that together can perform deep packet inspection operations on data packets for various purposes including, for example, restricting website access, virus detection, prevention of denial-of-service (DoS) attacks, unauthorized access attempts, and so on. In operation, the parser engine receives an input string (e.g., from the packet payload), examines the format and contents of the input string, and then removes portions of the input string that are not relevant to the requested search operation. The remaining or extracted portions of the input string are forwarded to the search engine as a filtered input string to be searched. In this manner, only portions of the input string that are relevant to the requested search operation are provided to and searched by the search engine, thereby not only reducing search times by reducing the size of the search string but also reducing the occurrence of false matches by not searching data that is not relevant to the requested search operation.

For some embodiments, the parser engine selectively activates the search engine when the filtered input string is available for search operations, thereby advantageously allowing the search engine to perform other searches until the filtered input string is ready for searching. Further, for some embodiments, the parser engine can analyze the contents of the input string and generate a rule set select signal that can be used to select a subset of the rules from the rules database to participate in the search operation performed by the search engine. For example, if the packet contains an HTTP request message that requests an HTTP website, then the parser engine can formulate the rule set select signal so that only rules pertaining to HTTP requests are used in the search operation (e.g., while rule sets pertaining to other protocols such as CIFS or FTP are not used in the search operation). In this manner, system resources can be conserved by allowing only rules that are relevant to the requested operation to participate in the search operation. Further, for embodiments in which the request message is provided to the content search system by an external network processor, parsing of the request message to determine a protocol type of the request message, to select which rules to search, and/or to trigger one or more components of the search engine are performed by parser within the content search system (e.g., rather than by the external network processor). By performing these operations within the parser of the content search system rather than in the external network processor, performance and throughput of the external network processor can be maximed.

For some embodiments, a normalizer can be coupled to the parser engine and used to de-obfuscate encoded portions of the filtered input string, thereby allowing the search engine to search an encoded input string using un-encoded regular expressions stored in the rules database. In addition, the ability to de-obfuscate encoded portions of the filtered input string can be advantageous in thwarting attempts to disguise malicious code, unauthorized accesses, and so on.

FIG. 1 shows a content search system 100 in accordance with some embodiments. Content search system 100 includes a parser engine 110, a search engine 120, and a rules database 130. The parser engine 110 receives a packet payload containing an input string from a network connection (not shown for simplicity), and examines the input string to (1) identify relevant portions of the input string to forward as the filtered input string to search engine 120 and (2) determine which rules or sets of rules stored in the rules database 130 are to be used to search the filtered input string. Further, for some embodiments, the parser engine 110 can generate a number of parser trigger signals (PTRG) that selectively enable corresponding components of the search engine 120 to search the filtered input string. The search engine 120, which can be any suitable search engine capable of performing regular expression search operations, includes inputs to receive the filtered input string (FIS), a rule set select signal (SEL_RS), and the PTRG signals from parser engine 110, includes ports coupled to the rules database 130, and includes an output to generate search results. The rules database 130, which can be any suitable type of memory device (e.g., DRAM, SRAM, EEPROM, Flash memory, and so on), includes a plurality of storage locations for storing a plurality of regular expressions or rules. For some embodiments, the rules can be stored in groups (e.g., as sets of related rules) within the rules database 130. Further, although depicted as separate from search engine 120 in FIG. 1, for other embodiments, the rules database 130 can be integrated within the search engine 120.

Figure 2:
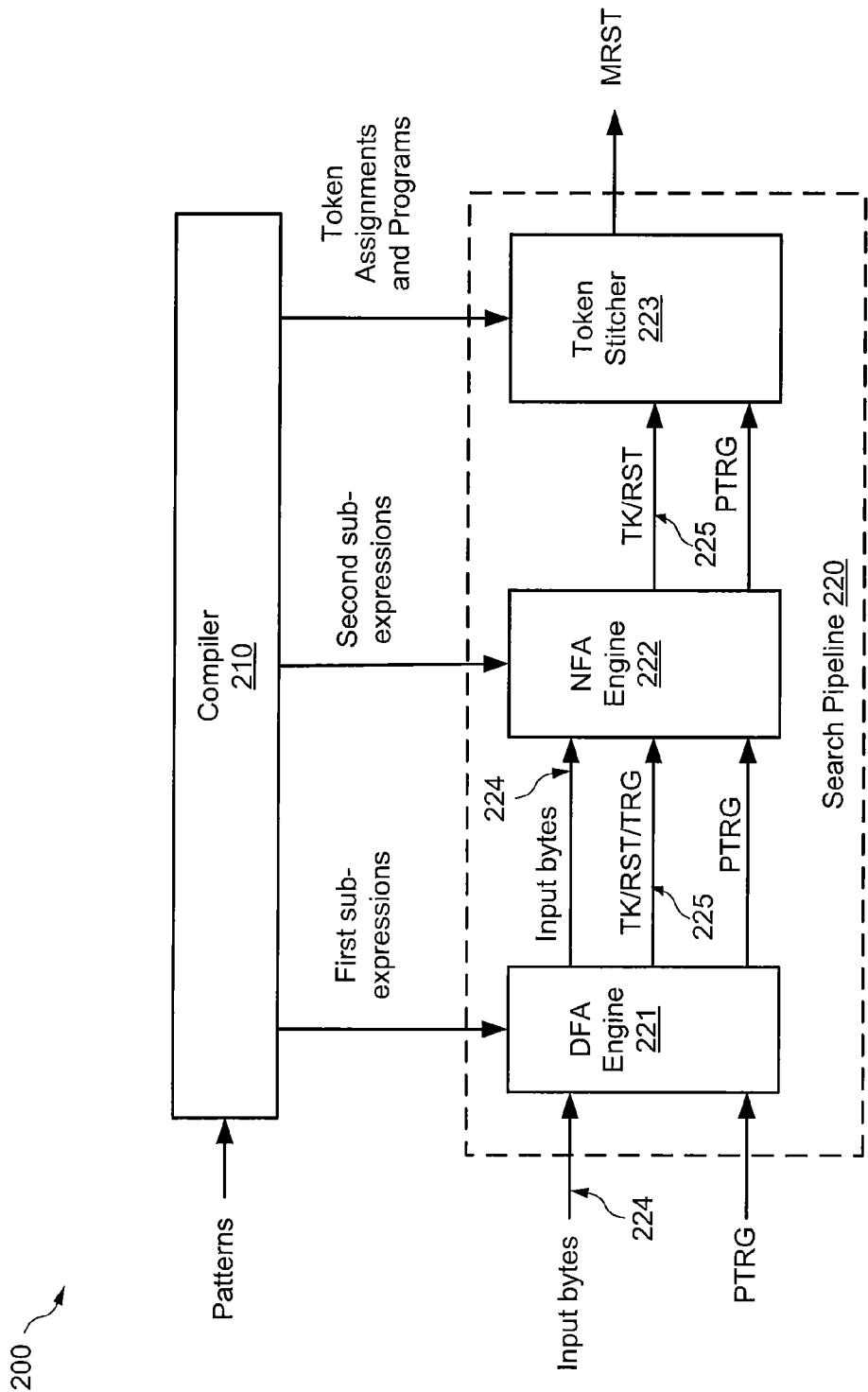
FIG. 2 shows one embodiment of the search engine of FIG. 1.

The search engine 120 can be implemented in hardware, software, or a combination of hardware and software. For some embodiments, search engine 120 can be implemented using a pipelined architecture of multiple search engines, for example, as depicted in FIG. 2. Thus, FIG. 2 shows a search engine 200 that is one embodiment of search engine 120 of FIG. 1. Search engine 200 includes a compiler 210 and a search pipeline 220. The search pipeline 220 includes a deterministic finite automaton (DFA) engine 221, a non-deterministic finite automaton (NFA) engine 222, a token stitcher 223, a data pipeline 224, and a result pipeline 225. Compiler 210 includes an input to receive a number of regular expressions to be stored in search engine 200, and includes outputs coupled to DFA engine 221, to NFA engine 222, and to token stitcher 223. Compiler 210, which can utilize any suitable compiling techniques, compiles (e.g., divides) each received regular expression into a number of sub-expressions and/or quantifiers, and assigns a token to each unique sub-expression. For some embodiments, the compiler divides selected regular expressions into sub-expressions that are separated by quantified wildcard operator such as ".*" and ".{n}". For example, compiler 210 can divide or segment the regular expression R3=ab.*cd.*ef into three different sub-expressions S1-S3, where S1=ab, S2=cd, and S3=ef, and assign sub-expression S1 to a first token, assign sub-expression S2 to a second token, and assign sub-expression S3 to a third token. After compiling the regular expression, the compiler 210 delegates each resulting sub-expression (and quantifiers, if applicable) to one of DFA engine 221 and NFA engine 222, and provides information to search pipeline 220 on how to process the regular expression. Thus, for example, compiler 210 can provide to DFA engine 221 information identifying the sub-expressions for which DFA engine 221 is responsible, can provide to NFA engine 222 information identifying the sub-expressions for which NFA engine 222 is responsible, and provide to token stitcher 223 stitching information about how to process tokens received from DFA engine 221 and NFA engine 222. More specifically, the stitching information instructs the token stitcher 223 how to stitch together the tokens (e.g., how to combine partial matches) generated by the DFA and NFA engines to generate an overall output match signal (MRST) indicating whether the input string matches one or more of the regular expressions.

For many regular expressions, the compiler 210 delegates exact patterns (e.g., strings) to the DFA engine 221, delegates inexact patterns (e.g., sub-expressions including some quantified character classes) to the NFA engine 222, and delegates unbounded sub-expressions (e.g., ".*" and {5,}) to the token stitcher 223. For example, for some exemplary embodiments, simple strings such as "ab" are delegated as first sub-expressions to the DFA engine, and sub-expressions having bounded quantified characters classes such as "z{5}" and [d-f]{10} are delegated as second sub-expressions to the NFA engine. For some regular expressions, the compiler 210 can delegate some exact patterns (e.g., patterns that are longer than a specified length) to the NFA engine 222.

DFA engine 221, which for some embodiments is optimized for performing exact match searches, includes an input to receive input characters or bytes from an input string, a control input to receive sub-expressions delegated to the DFA engine by the compiler 210, and includes an output to provide tokens (TK), match results (RST), and/or a trigger signal (TRG) onto the result pipeline 225. As explained in more detail below, the tokens (TK) generated by DFA engine 221 indicate partial matches between the input string and sub-expressions stored in the DFA engine 221, the match results (RST) generated by DFA engine 221 indicate complete matches between the input string and rules or regular expressions stored entirely in the DFA engine 221, and the trigger signal TRG activates the NFA engine 222 to begin processing the input bytes in the data pipeline 224.

NFA engine 222, which is capable of performing inexact match searches, includes a first input to receive the input bytes from the data pipeline 224, includes a second input to receive tokens (TK), match results (RST), and/or the trigger signal (TRG) from DFA engine 221 via the result pipeline 225, includes a control input to receive sub-expressions delegated to the NFA engine by the compiler 210, and includes an output to provide tokens (TK) and match results (RST) onto the result pipeline 225. The tokens (TK) generated by NFA engine 222 indicate partial matches between the input string and sub-expressions stored in the NFA engine 222, and the match results (RST) generated by NFA engine 222 indicate complete matches between the input string and rules or regular expressions stored entirely within the NFA engine or entirely within the DFA and NFA engines.

The token stitcher 223 includes a first input to receive tokens (TK) and match results (RST) from engines 221 and/or 222 via the result pipeline 225, includes a control input to receive token assignments and associated programs from the compiler 210, and includes an output to generate a match result signal MRST that indicates whether the input string matches one or more of the regular expressions stored in the content search engine 200. As described in more detail below, the token stitcher 223 is configured to combine and selectively process the tokens (TK) to generate the match result (MRST). Further, in accordance with present embodiments, the token stitcher 223 can be used to implement unbounded sub-expressions such as ".*" without maintaining active state of a state machine or using the resources of the DFA and NFA engines. Note that match results (RST) generated by DFA engine 221 and/or NFA engine 222 are passed through the token stitcher 223 and provided as output match results (MRST).

Figure 3A:
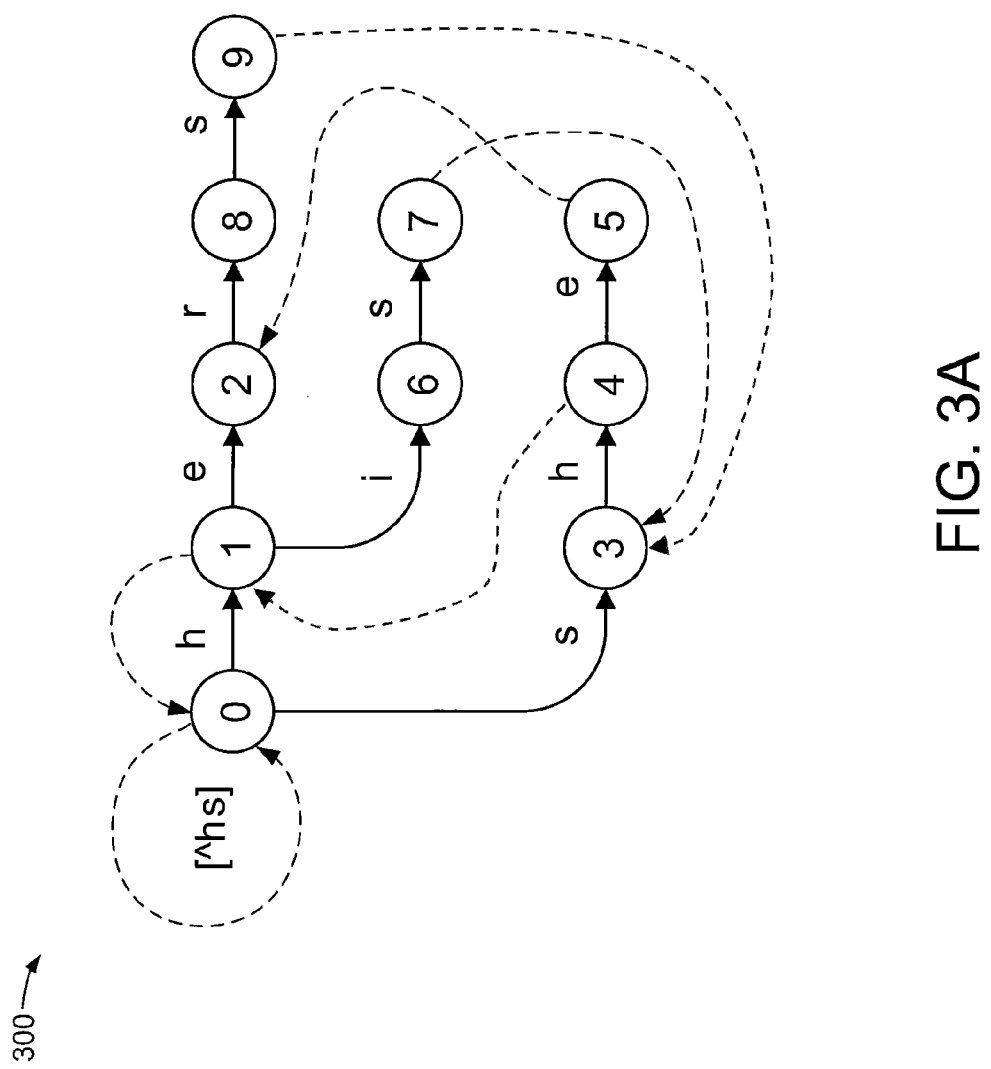
FIG. 3A shows a state machine configured to search an input string for the patterns {he, she, his, hers} according to the Aho-Corasick algorithm.

As mentioned above, for some embodiments, DFA engine 221 is optimized for exact match operations. More specifically, for exemplary embodiments described herein, DFA engine 221 performs search operations according to the Aho-Corasick algorithm. For example, FIG. 3A illustrates a goto-failure state graph 300 that embodies a search operation for the strings {he, she, his, hers} according to the well-known Aho-Corasick (AC) state machine. Search operations between an input string and the strings or signatures {he, she, his, hers} begin at the root state (state 0), at which the first input character is compared with the two goto transitions "h" and "s" originating at state 0. If there is a match, then the matching goto transition is taken to the next state. Each of the goto transitions is depicted as a solid line extending from the previous state to the next state, and is accompanied by the character value or "edge" that enables the goto transition to the next state. For example, if the first input character is an "h," then the "h" goto transition is taken to state 1, and then the next input character is compared with the corresponding goto transitions "e" and "i" originating at state 1.

If there is not a match between the current input character and any of the success edges associated with the current state, then a failure transition is taken to a fail state. The failure transitions are depicted as dotted lines in FIG. 3A. Although not shown for simplicity, each of states 2, 3, 6, and 8 includes a failure transition to the root state. For example, if the current input character examined at state 1 is not an "e" or an "i," then the failure transition is taken from state 1 to the root state.

Some of the failure transitions terminate at states other than the root state because a portion of another string has already been matched. For example, if the current input character examined at state 4 is not an "e," the failure transition is taken to state 1 because the "h" edge to state 1 has already been matched. In addition, states 2, 5, 7, and 9 are designated as output states because if any of those states is reached, at least one of the signatures has been matched by the input string, and an output code indicating the matching signature can be provided.

Figure 3B:
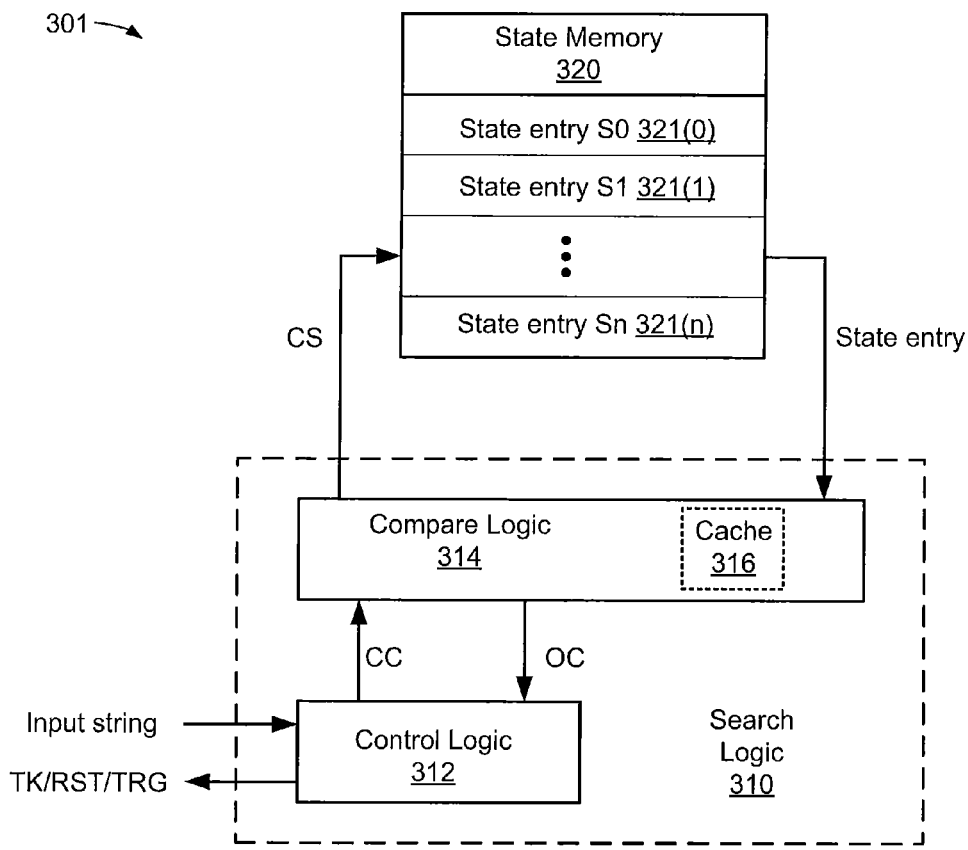
FIG. 3B shows a DFA search engine configured to perform string searches using deterministic state machines of the type shown in FIG. 3A.

FIG. 3B shows a search engine 301 that can perform search operations according to state machines of the type described above with respect to FIG. 3A. Search engine 301, which is one embodiment of DFA engine 221 of FIG. 2, includes search logic 310 coupled to a state memory 320. State memory 320, which can be any suitable type of randomly addressable memory (RAM) device (e.g., an SRAM, DRAM, EEPROM, or Flash Memory device), includes a plurality of storage locations 321(0)-321(n) for storing state information of a search tree. For simplicity, each storage location 321 of state memory 320 is depicted in FIG. 3B as storing the state entry for a corresponding one of states S0-Sn of a search tree to be searched, although it is noted that some state entries may require more than one row in state memory 320.

Figure 3C:
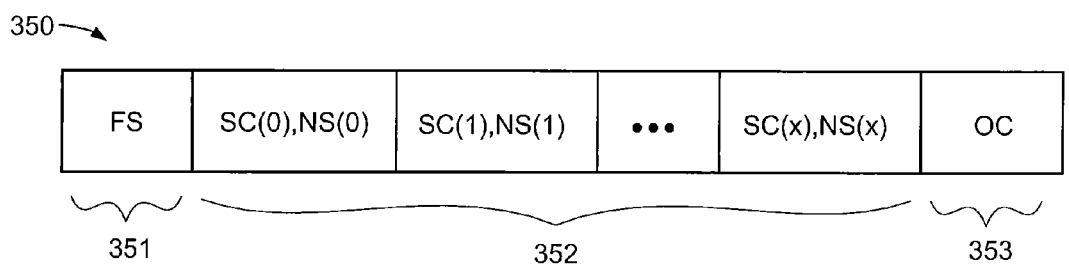
FIG. 3C shows an exemplary data format for the state entries of a typical state machine stored in the search engine of FIG. 3A.

FIG. 3C shows an exemplary state entry 350 that is illustrative of the format of the state entries stored in state memory 320 of FIG. 3B. State entry 350 includes a fail state (FS) field 351, a success transition field 352, and an output code (OC) field 353, and may be collectively represented as {FS; ST[0: x]; OC}. More specifically, the FS field 351 stores a single state value that indicates the fail state of the state represented by state entry 350, the ST field 352 stores one or more pairs of success characters (SC) and corresponding next state (NS) values, and the OC field 353 stores one or more output codes. For example, the state entry for state 1 of the goto-failure graph 100 of FIG. 1 can be represented as S1={0; e,2; i,6; 0}, where FS=0 indicates that the root state 0 is the fail state of state 1, ST[0]="e,2" indicates that state 1 includes an "e" success transition to a next state 2, ST[1]="i,6" indicates that state 1 includes an "i" success transition to a next state 6, and OC=0 indicates that state 1 does not include an output code. The output codes for the match states of the state machine stored in state memory 320 also include tokens, match results, and/or trigger signals.

Search logic 310 includes control logic 312 and compare logic 314. Control logic 312, which includes an input port to receive an input string from a network connection (not shown for simplicity) and an output port to provide search results, controls search operations between the input string and the signatures embodied by the search tree stored as state entries in state memory 320. Note that the search results generated by search logic 310 can be provided to another circuit for further processing and/or can be used internally (e.g., within search engine 301). Compare logic 314, which is coupled to state memory 320 and to control logic 312, implements the string search operation using a DFA embodied by the search tree stored in state memory 320. Further, although not shown in FIG. 3C for simplicity, search logic 310 typically includes registers, logic, and/or other suitable circuitry for storing and incrementing an input cursor (C) that points to the current input character of the input string being searched.

For example, during search operations, compare logic 314 provides a current state (CS) value as an address to state memory 320, which in response thereto outputs a corresponding state entry to compare logic 314. Compare logic 314 then compares the current character (CC) extracted from the input string by control logic 312 (e.g., in response to the cursor values) to the success characters (SC) of the success transition fields in the retrieved state entry to determine the next state in the search tree. If the current character matches one of the state's success transitions, the corresponding next state (NS) value is read from the state entry, and the next state value is used as the new current state (CS) value to address and retrieve the corresponding next state entry from state memory 320. A cache memory 316 is typically provided to store the state entry for the root state so that the corresponding state entry is locally stored within compare logic 314 and can thus be quickly retrieved without accessing state memory 320. In this manner, edge failures to the root state do not require access to state memory 320, thereby eliminating RAM read latencies when the state machine fails to the root state. Other state entries (e.g., such as state entries that are frequently accessed by the search engine) can also be stored in cache memory 316.

Figure 4:
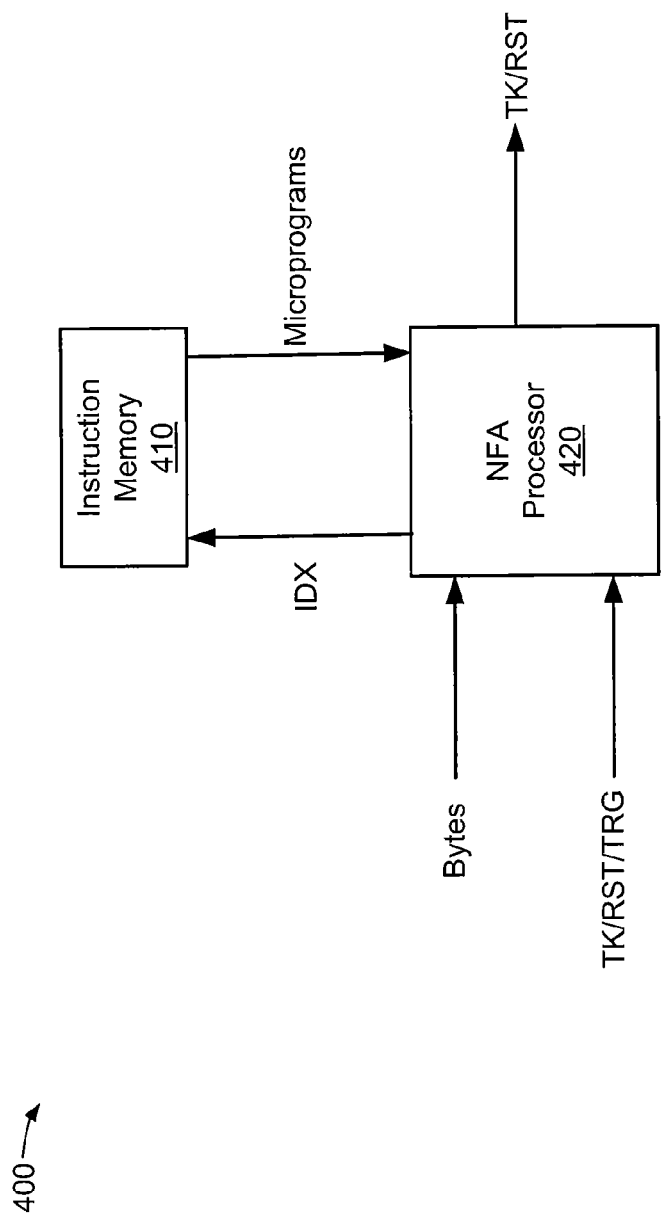
FIG. 4 shows an NFA engine that is one embodiment of the NFA search engine of FIG. 2.

NFA engine 222 can be any suitable search engine capable of performing inexact match operations. For some exemplary embodiments described herein, NFA engine 222 performs search operations (at least in part) by executing microprograms (e.g., instructions) that embody the inexact and/or exact patterns delegated thereto. For example, FIG. 4 shows an NFA engine 400 that is one embodiment of NFA engine 222 of FIG. 2. NFA engine 400 includes an instruction memory 410 and an NFA processor 420. Instruction memory 410, which can be any suitable type of memory device such as SRAM or DRAM, includes a plurality of storage locations for storing a plurality of microprograms. Each microprogram, which can be retrieved using a corresponding microprogram index (IDX), embodies one of the inexact patterns specified by one or more of the regular expressions searched for by content search engine 200. NFA processor 420 is configured to execute any of the microprograms stored in instruction memory 410 to determine whether an input string matches one of the inexact patterns embodied in the microprograms. For other embodiments, NFA processor 420 can be used to search an input string for both exact patterns and inexact patterns (e.g., by embodying the exact patterns and inexact patterns into microprograms stored in the instruction memory 410). For one embodiment, NFA engine 222 can be similar to the NFA engines disclosed in commonly-owned U.S. Pat. No. 7,539,032, which is incorporated by reference herein in its entirety.

Referring again to FIG. 2, during search operations between an input string and regular expressions stored in the search engine 200, input bytes (e.g., characters of the input string) are provided to the content search engine 200 via the data pipeline 224. The DFA engine 221 receives the input bytes or characters, and compares each input character with the sub-expressions for which DFA engine 221 is responsible (e.g., as embodied by signatures in the state machine stored in DFA engine 221). For each character comparison, if DFA engine 221 finds a match between the input string and a sub-expression for which DFA engine 221 is responsible, then DFA engine 221 outputs either the token TK associated with the matched sub-expression or the match result signal RST associated with the matched rule onto the result pipeline 225. For example, if the pattern matched by the DFA engine is part of a regular expression having other sub-expressions delegated to NFA engine 222, then DFA engine 221 outputs the token indicating a partial match with the regular expression. If the pattern matched by the DFA engine is an entire rule, then DFA engine 221 outputs the match result RST indicating a match between the input string and the rule.

Conversely, if DFA engine 221 does not find a match between the input string and a sub-expression for which DFA engine 221 is responsible, then DFA engine 221 does not generate an output.

The DFA engine 221 can also send a trigger (TRG) signal to NFA engine 222 to instruct NFA engine 222 to search for a particular sub-expression for which NFA engine 222 is responsible. Thus, for some embodiments, NFA engine 222 does not perform any compare operations on the input string unless instructed by DFA engine 221, thereby conserving the limited resources of the NFA engine. As a result, NFA engine 222 can operate more efficiently than prior approaches in which the NFA engine processes all the characters of the input string. Further, allowing the DFA engine 221 to directly trigger the NFA engine 222 (e.g., in response to an asserted trigger signal) in a pipelined manner maximizes performance. This is in contrast to the search system disclosed in commonly-owned U.S. Pat. No. 7,539,032, which uses the result memory to trigger the NFA engine.

DFA engine 221 can be instructed as to how to trigger NFA engine 222 by the information provided by compiler 210. In other words, when compiler 210 compiles a regular expression, compiler 210 provides information to DFA engine 221 indicating the conditions under which to trigger the NFA engine 222 to start performing compare operations on the input string. For example, the DFA engine 221 can be instructed by compiler 210 to trigger NFA engine 222 if DFA engine 221 finds a match between a portion of the input string and a selected sub-expression stored in its state memory 320.

In some embodiments, regardless of whether DFA engine 221 generates a token or a match result (e.g., in response to finding a match between the input string and the sub-expressions for which it is responsible), the input characters are provided via the data pipeline 224 to NFA engine 222 for search operations therein. Thus, NFA engine 222 receives the same input string as DFA engine 221 and, when activated, processes the same input characters in the same order as DFA engine 221 (i.e., DFA engine 221 does not provide an altered input stream to NFA engine 222). In this manner, the input bytes are processed by the DFA and NFA engines in a pipelined fashion.

As mentioned above, NFA engine 222 begins comparing characters in the input stream received from DFA engine 221 with those sub-expressions for which NFA engine 222 is responsible when triggered by DFA engine 221. If the NFA engine 222 finds a match between the input stream and an associated sub-expression, then NFA engine 222 outputs either the token TK associated with the matched sub-expression or the match result signal RST associated with the matched rule onto the result pipeline 225. For example, if the pattern matched by the NFA engine is part of a regular expression having other sub-expressions delegated to DFA engine 221, then NFA engine 222 outputs the token indicating a partial match with the regular expression onto the result pipeline 225. If the pattern matched by the NFA engine is an entire rule, then NFA engine 222 outputs the match result RST indicating a match between the input string and the rule onto the result pipeline 225.

In response to the tokens issued by the DFA engine 221 and the NFA engine 222, the token stitcher 223 determines whether the input string matches any of the regular expressions stored in the search system. More specifically, the token stitcher 223 stitches together the tokens provided by the DFA and/or NFA engines 221 and 222 to determine whether the input string matches one or more of the regular expressions stored in the content search engine 200. Because the DFA engine 221 and the NFA engine 222 output tokens on the result pipeline 225 as they sequentially process bytes of the input string, the tokens are received by token stitcher 223 in the same order as the input characters that resulted in their generation, regardless of which engine generated the tokens. For example, if DFA engine 221 issues token T1 after processing character 2 of the input stream and issues token T3 after processing character 5 of the input stream, and if NFA engine 222 issues token T2 after processing character 3 of the input stream, then token stitcher 223 will receive token T1 first, then token T2, and finally token T3. In this manner, the token stitcher 223 does not need to re-order the tokens provided onto the result pipeline 225 by the DFA and NFA engines.

For some embodiments, result data output by the DFA and NFA engines onto the result pipeline 225 includes identifiers (e.g., a number of leading or most significant bits) that indicate whether the result data is a token TK, a match result RST, or a trigger signal TRG. For an exemplary embodiment, the DFA and NFA engines are configured to output an N-bit result data that includes a 2-bit identifier and a data field of N-2 bits where, for example, an identifier "00" indicates that the result data is a token, an identifier "01" indicates that the result data is a match result, and an identifier "10" indicates that the result data is a trigger signal (of course, for other embodiments, other identifiers code can be assigned to the tokens, engine results, and trigger signal). In this manner, the NFA engine 222 can be configured to latch only trigger signals provided onto the result pipeline 225 (e.g., by looking for data groups that begin with the trigger identifier "10"), thereby ignoring tokens and match results provided by DFA engine 221 onto the result pipeline 225. Similarly, the token stitcher 223 can be configured to latch only tokens provided onto the result pipeline 225 (e.g., by looking for data groups that begin with the token identifier "00"), thereby ignoring match results RST that can be output as overall match results MRST.

Figure 5:
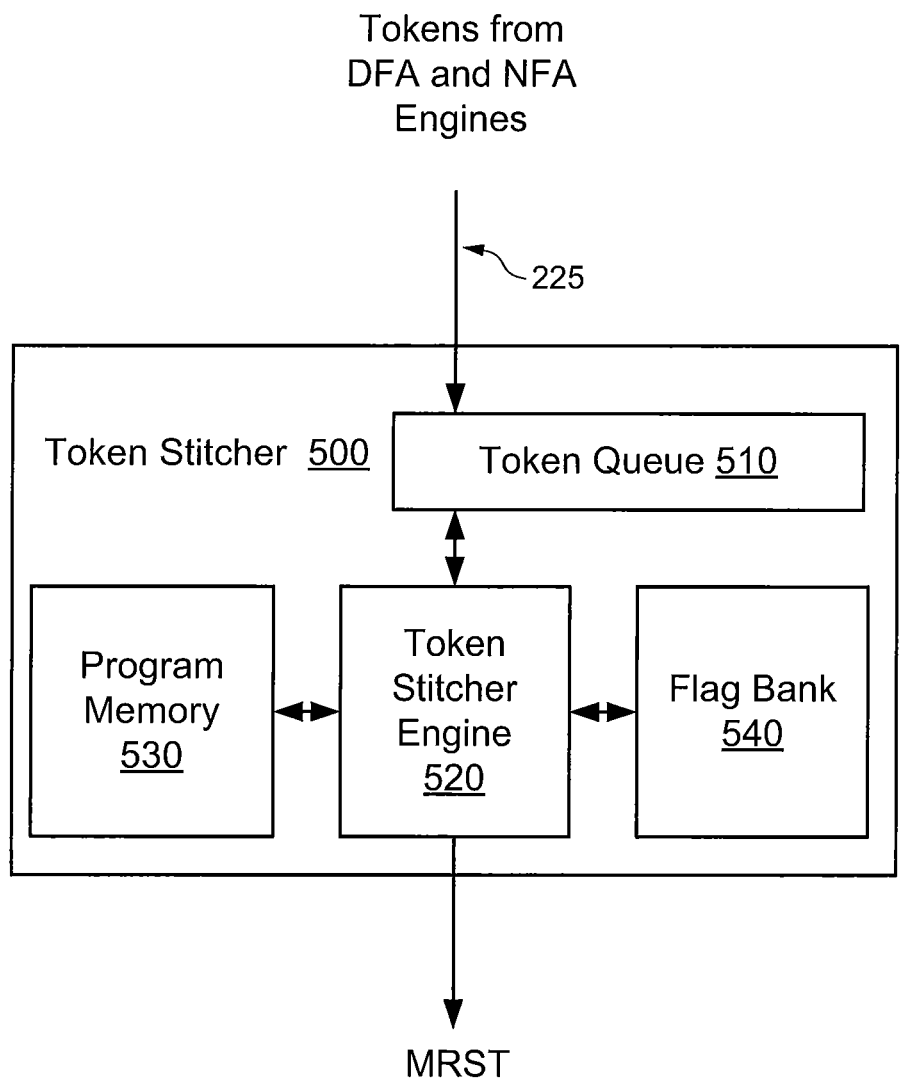
FIG. 5 is a functional block diagram of a token stitcher in accordance with some embodiments.

FIG. 5 is a block diagram of a token stitcher 500 that is one embodiment of token stitcher 223 of FIG. 2. As shown in the exemplary embodiment of FIG. 5, token stitcher 500 includes a token queue 510, a token stitcher engine 520, a program memory 530, and a flag bank 540. The token queue 510 includes an input to receive tokens from the result pipeline 225, and includes an output coupled to the token stitcher engine 520. The token stitcher engine 520 is coupled to both program memory 530 and flag bank 540, and includes an output to generate the overall match result (MRST).

More specifically, tokens received by token stitcher 500 are initially stored in token queue 510 until they can be processed by token stitcher engine 520. Token queue 510 can be any suitable memory device or element that can queue tokens. For some embodiments, token queue 510 is a first-in-first-out (FIFO) queue.

Token stitcher engine 520, which can be implemented in software, microcode, or any other set of executable instructions, or hardware, uses tokens received from the result pipeline 225 to retrieve corresponding programs from program memory 530. Then, the token stitcher engine 520 executes the retrieved program to set one or more flags stored in the flag bank 540, to check the status of one or more flags stored in the flag bank, and to stitch together the partial results associated with the tokens to generate the overall match result signal MRST.

Program memory 530, which can be any suitable memory device or element, stores one or more programs that can be addressed by the tokens received from the result pipeline 225. The programs stored in program bank 530, which are constructed by compiler 210, embody portions of various regular expressions stored in the content search engine 200, and instruct the token stitcher engine 520 how to combine (e.g., stitch together) the tokens generated by the DFA and NFA engines to generate the output match result MRST. For example, when a set of regular expressions is compiled, compiler 210 creates and stores one or more associated programs in the program memory 530. Thereafter, compiler 210 can inform DFA engine 221 and NFA engine 222 of the sub-expressions for which they are responsible, as well as the tokens associated with those sub-expressions.

Flag bank 540, which can be any suitable memory device or element, stores a plurality of flags that indicate whether partial matches are detected by DFA engine 221 and/or NFA engine 222. More specifically, each flag stored in the flag bank 540 indicates that a sequence of tokens and the appropriate separators (e.g., number of input characters) between them have been seen, and therefore whether sub-expressions delegated to DFA engine 221 and NFA engine 222 have been found in the input string. Thus, for some embodiments, the flags stored in the flag bank 540 are used to "remember" what sub-expressions have been seen for a particular input string. In this manner, the flag bank 540 can be used to remember the partial match results generated by the DFA and NFA engines, thereby advantageously increasing the speed of the NFA engine and/or allowing the states of the NFA engine to be used for implementing other regular expressions (e.g., thereby increasing processing capacity). Further, because flag bank 540 is essentially a memory device, it can be easily expended to include additional memory locations to store greater numbers of flags. In contrast, it is much more difficult to expand the number of states implemented in the NFA engine 222. Thus, by using the flag bank 540 to remember partial match results generated by the DFA and NFA engines, rather than using the limited resources of the NFA engine 222, data throughput is increased as compared to conventional search systems of the type disclosed in U.S. Pat. No. 7,539,032. For one embodiment, NFA engine 222 includes 64 states, and flag bank 540 includes 128 memory locations to store 128 flags.

For some embodiments, flag bank 540 uses a different set of flags for each input string or flow processed by the search engine 200. Thus, a single flag within flag bank 540 is only used for a single input string at a time. However, flag bank 540 can accommodate the processing of multiple input strings by supporting more flags than are allocated to a single input string at a time.

As mentioned above, when a program associated with a token is executed, the program can access flag bank 540 to either check the status of and/or set one or more flags stored therein. This enables token stitcher engine 520 to remember what partial matches (e.g., sub-expressions delegated to the engines 221 and 222) have been detected and to determine whether there is a match between the input string and one or more regular expressions.

FIG. 6 depicts three illustrative regular expressions R1-R3 and the tokens assigned to each of the unique sub-expressions within the three regular expressions, where R1="ab", R2="ab.*cd.*ef", and R3="ab.*cristion". Thus, R1 includes a single sub-expression "ab", R2 includes three sub-expressions "ab", "cd", and "ef", and R3 includes two sub-expressions "ab" and "cristian". As depicted in FIG. 6, the sub-expression "ab" is assigned to token T1, the sub-expression "cd" is assigned to token T2, the sub-expression "ef" is assigned to token T3, and the sub-expression "cristian" is assigned to token T4. Even though each of regular expressions R1, R2, and R3 include the sub-expression "ab", the unique sub-expression "ab" is assigned to a single corresponding token T1.

Table 610 of FIG. 6 depicts illustrative token programs (e.g., as stored in program memory 530 of FIG. 5) associated with each the four tokens T1-T4 assigned to the various unique sub-expressions included within the group of regular expressions R1-R3. Referring also to FIG. 5, each program includes one or more instructions that can be executed by the token stitcher engine 520 in response to receiving tokens generated by the pipelined engines via the result pipeline. For the example of FIG. 6, the sub-expressions are all stored in the DFA engine 221. Thus, during search operations between an input string and the regular expressions R1-R3, if DFA engine 221 detects a match with the sub-expression "ab", the engine issues token T1 onto the result pipeline 225, and the token T1 is queued in the token queue 510. In response thereto, the token stitcher engine 520 uses token T1 to retrieve the corresponding program from the program memory 530, and executes the instructions I1(1) and I1(2) associated with the T1 program. More specifically, execution of instruction I1(1) causes the token stitcher engine 520 to assert MRST to indicate a match with regular expression R1, and execution of instruction I1(2) causes the token stitcher engine 520 to set a first flag F1 in the flag bank 540 indicating that the sub-expression "ab" has been found. In this manner, flag bank 540 remembers that a partial match with "ab" associated with token T1 has been found.

Then, if DFA engine 221 detects a match with the sub-expression "cd", the engine issues token T2 onto the result pipeline 225, and the token T2 is queued in the token queue 510. In response thereto, the token stitcher engine 520 uses token T2 to retrieve the corresponding program from the program memory 530, and executes the instruction I2(1) associated with the T2 program. More specifically, execution of instruction I2(1) causes the token stitcher engine 520 to check the status of the flag F1 stored in the flag bank 540, and if the flag F1 is set (which indicates a partial match has been found with sub-expression "ab"), then the token stitcher engine 520 sets the flag F2 indicating that the sub-expression "cd" has been found. In this manner, flag bank 540 remembers that a partial match with "cd" associated with token T2 has been found.

Checking the status of the flag F1 associated with "ab" before setting the flag F2 associated with "cd" ensures that the sub-expression "ab" appears in the input string before the sub-expression "cd" (e.g., by checking to ensure that token T1 is received by the token stitcher before token T2). For other embodiments (not shown in FIG. 6), the T2 program can be configured to set the flag F2 regardless of whether the flag F1 is set, in which case the T2 program is responsible for determining whether the tokens T1 and T2 are received in the order specified by the corresponding regular expression(s).

Next, if DFA engine 221 detects a match with the sub-expression "ef", the engine issues token T3 onto the result pipeline 225, and the token T3 is queued in the token queue 510. In response thereto, the token stitcher engine 520 uses token T3 to retrieve the corresponding program from the program memory 530, and executes the instruction I3(1) associated with the T3 program. More specifically, execution of instruction I3(1) causes the token stitcher engine 520 to check the status of the flag F2 stored in the flag bank 540, and if the flag F2 is set (which indicates a partial match has been found with sub-expressions "ab" and "cd"), then the token stitcher engine 520 asserts MRST to indicate that the input string matches the regular expression R2. In this manner, flag bank 540 remembers that partial matches with "ab" and "cd" have been found, and allows the token stitcher engine 520 to assert MRST if the sub-expression "ef" is subsequently found.

Otherwise, if DFA engine 221 detects a match with the sub-expression "cristian", the engine issues token T4 onto the result pipeline 225, and the token T4 is queued in the token queue 510. In response thereto, the token stitcher engine 520 uses token T4 to retrieve the corresponding program from the program memory 530, and executes the instruction I4(1) associated with the T4 program. More specifically, execution of instruction I4(1) causes the token stitcher engine 520 to check the status of the flag F1 stored in the flag bank 540, and if the flag F1 is set (which indicates a partial match has been found with sub-expression "ab"), then the token stitcher engine 520 asserts MRST to indicate that the input string matches the regular expression R3. In this manner, flag bank 540 remembers that a partial match with "ab" has been found, and allows the token stitcher engine 520 to assert MRST if the sub-expression "cristian" is subsequently found.

The ability for the token stitcher to remember that sub-expressions (e.g., partial matches) have been found allows the token stitcher to implement the unbounded sub-expression ".*" by setting flags in the flag bank 540, thereby avoiding the need to invoke the NFA engine 222 to implement the ".*" function. For example, after the flag F1 is set in response to DFA engine 221 detecting a match with "ab", the NFA engine 222 is not triggered (thereby not activating states in the NFA engine for regular expressions R1-3), and the DFA engine 221 continues to compare characters of the input string with the sub-expressions to determine whether the sub-expressions "cd" and "ef" are subsequently detected or if the sub-expression "cristian" is subsequently detected. Thus, for example, regardless of how many characters appear in the input string between the sub-expressions "ab" and "cristian", the token stitcher 500 remembers the partial match with "ab" upon detecting the partial match with "cristian" and can therefore declare a match condition with regular expression R3 simply by checking the status of the flag F1. This is in contrast to prior search systems (such as that disclosed in U.S. Pat. No. 7,539,032) that typically delegate sub-expressions with the ".*" function (e.g., the sub-expression ".*cristian") to the NFA engine.

Although described above as being able to implement the unbounded sub-expression ".*", the token stitchers of the present embodiments can also be used to implement other unbounded sub-expressions such as included in the following regular expression: R21="ab.{5,}cd", R22="ef.{0,5}gh", R23="ij[^\n]*kl", and R24="^.{5,15}mn". Note that the ^in R24 indicates start-anchoring (the expression means find the string "mn" at distance somewhere between 5 and 15 characters from the start of the input stream, and that the [^\n] in R23 indicates that the "filler" between the two strings of interest "ij" and "kl" should consist of non-newline characters. Thus, more generally speaking, the token stitcher can implement other unbounded sub-expressions, such as quantifiers of the form {n,}, {n,m}, and {0,m}, by storing an offset to the input string for each token identifying which character of the input string resulted in generation of the token, and using such offset information to ensure that any quantifiers are satisfied.

Referring again to FIGS. 1 and 2, the parser engine 110 can be configured to selectively activate one or more of the DFA engine 221, the NFA engine 222, and/or the token stitcher 223. For example, in response to analyzing the input string, the parser engine 110 can send parser-generated trigger signals (PTRG) to DFA engine 221, the NFA engine 222, and/or the token stitcher 223 to selectively activate (e.g., enable) them for regular expression search operations. For some embodiments, the engines 221-223 within search pipeline 220 are not enabled for search operations unless the parser engine 110 enables them (e.g., by asserting a corresponding one of the trigger signals PTRG). As mentioned above, for some embodiments, the parser engine 110 can determine the protocol type of an incoming input string, and in response thereto (1) extract relevant portions of the input string to forward as the filtered input string to search engine 120, (2) select a relevant set of rules to be used by the search engine 120 during search operations, and (3) selectively enable one or more engines of search engine 120.

Figures 7A, 7B:
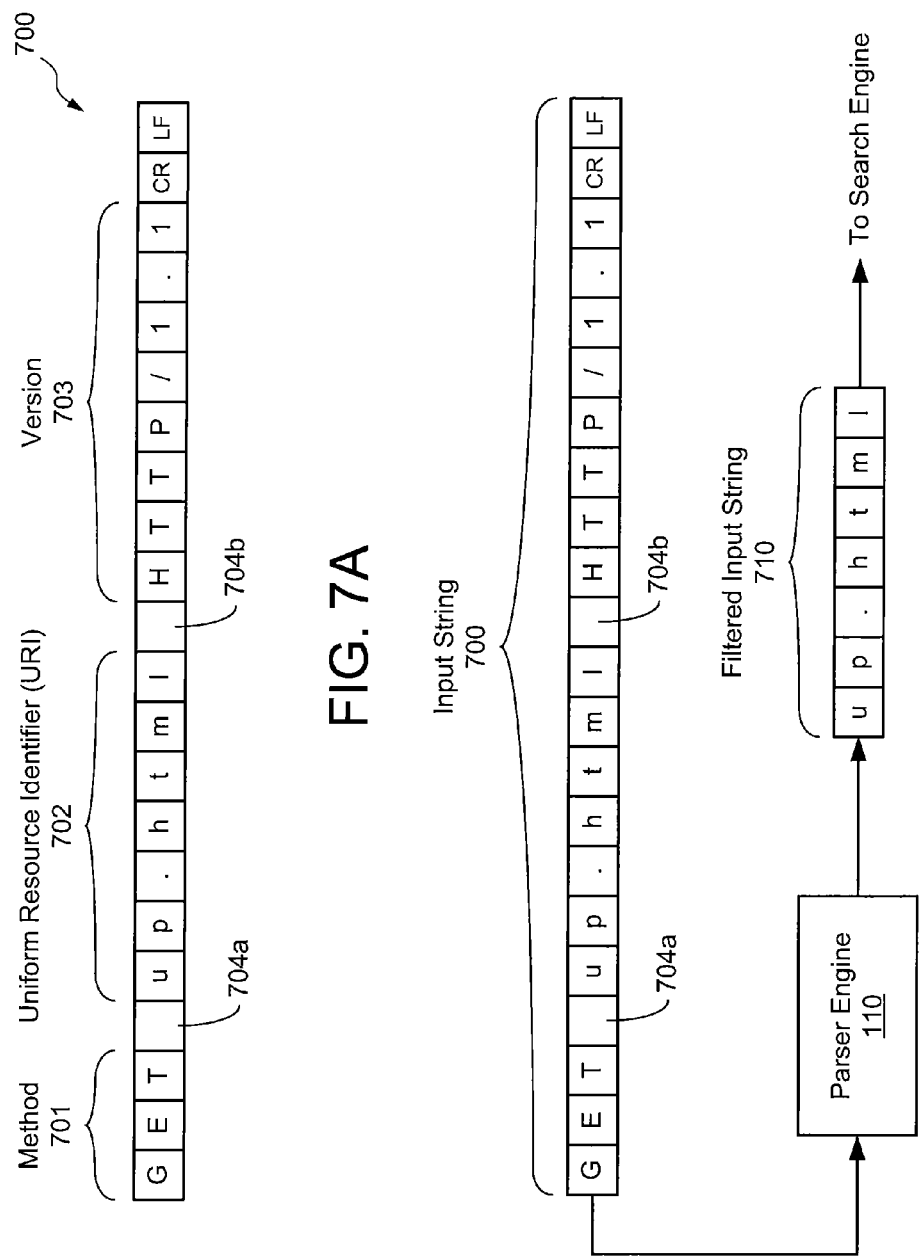
FIG. 7A depicts a data format of an HTTP request message.
FIG. 7B depicts the HTTP request message of FIG. 7A being parsed by the parser engine of FIG. 1 in accordance with some embodiments.

For example, FIG. 7A depicts an exemplary data format of a request line 700 of an HTTP request message. The HTTP request message 700 includes three distinct fields: a method field 701 indicating the type of action to be performed (e.g., "GET"); a uniform resource identifier (URI) field 702 indicating the network resource on which the action is to be performed (e.g., "up.html"); and a version field 703 indicating the version of the HTTP protocol being used (e.g., "HTTP/1.1"). The last two bytes of the HTTP message 700 include a carriage return (CR) followed by a line feed (LF) that signal the end of the request line 700. The URI field 702 is typically the primary (if not the only) field of interest for any given HTTP request message because it identifies the address or location of a requested network resource for which access may be restricted (e.g., potentially harmful websites, inappropriate websites, protected system resources, and so on). The method field 701 specifies one of nine standard actions defined by the HTTP protocol (e.g., GET, HEAD, POST, PUT, DELETE, TRACE, OPTIONS, CONNECT, and PATCH), and the version field 703 indicates the HTTP version being used (e.g., by the client or browser).

Note that the method field 701 and the URI field 702 are separated by a first whitespace 704a, and the URI field 702 and the version field 703 are separated by a second whitespace 704b. These whitespaces 704a and 704b can be used by the parser engine 110 to identify the start and end positions of the method field 701, the URI field 702, and the version field 703, as explained in more detail below.

FIG. 7B illustrates an exemplary operation of the parser engine 110 of FIG. 1 extracting relevant portions from the request line 700 of FIG. 7A to generate a filtered input string 710. More specifically, the input string "GET up.html HTTP/1.1" of FIG. 7B, which corresponds to the first line of the HTTP request message 700 of FIG. 7A, includes the method, "GET," the URI "up.html," and the version "HTTP/1.1". As discussed above, the URI field is usually the most relevant field for regular expression search operations because it identifies the network resource upon which a particular action is to be performed. Thus, for the exemplary operation depicted in FIG. 7B, the parser engine 110 is configured to parse the input string 700 to extract characters associated with the URI field and to discard or otherwise ignore characters associated with other fields (e.g., the method and version fields), thereby resulting in the filtered input string 710 containing only the characters of the URI field: "up.html". In this manner, parser engine 110 discards input characters that are not needed by DFA engine 221, NFA engine 222, or token stitcher 223 of search engine 120. Thus, by removing characters associated with the get and version fields of the input string 700, the parser engine 110 can reduce the associated search time in search engine 120 by reducing the number of characters provided to the search engine 120. Further, by eliminating unneeded characters (e.g., associated with the method and version fields) from the input string, parser engine 110 can also reduce the chances of a false match condition in the search engine 120. Note that the parser engine 110 can determine the protocol type of the request message and can distinguish between and identify the various fields of the request message without assistance from an external network processor that provides the request message to the content search system. In this manner, the present embodiments can alleviate the external network processor from performing these functions, for example, to increase the throughput of the external network processor.

In addition, because only the characters associated with the URI field are forwarded to the search engine 120, the parser engine 110 can be configured to construct the rule set select signal (SEL_RS) in a manner that instructs the search engine 120 to apply only those rules in rules database 130 that pertain to HTTP protocols, or more specifically, only those rules that pertain to URI values. In this manner, rules that do not pertain to the URI field are not searched for in the filtered input string, thereby not only conserving limited search resources but also further reducing the likelihood of false match conditions.

In contrast, conventional search systems that forward the entire input string 700 to downstream search engine 120 for regular expression search operations would not only take longer to complete the search operation than present embodiments (e.g., because all fields of the input string would be searched), but also may result in one or more false match conditions (e.g., because the characters of the non-relevant get and version fields could possibly match one or more of the rules being searched for). Further, in contrast to present embodiments, prior search systems typically search the input string for all rules stored in the rules database, rather than only for those sets of rules that are deemed to be relevant to the requested search operation.

Figure 8:
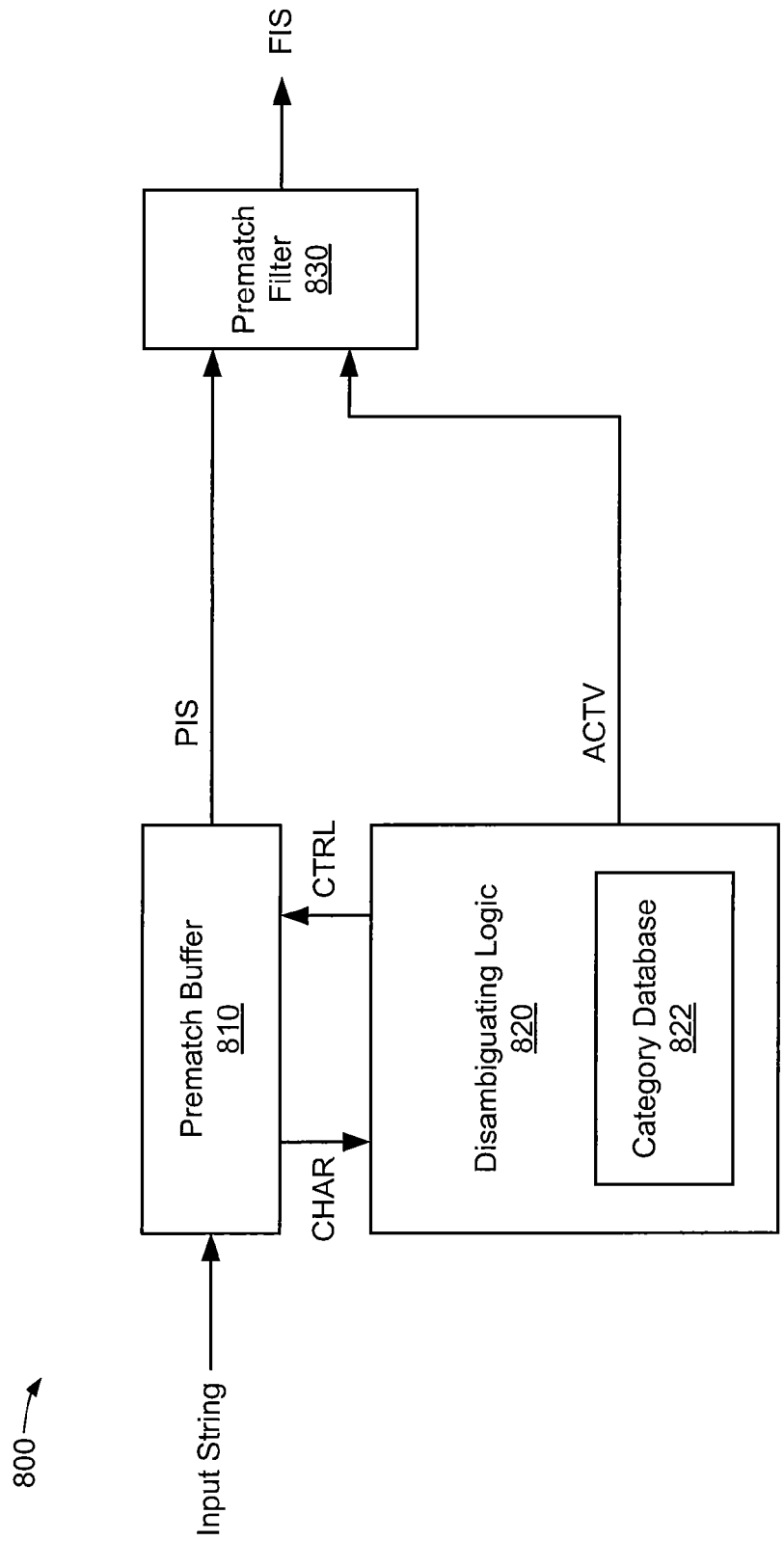
FIG. 8 is a more detailed embodiment of the parser engine of FIG. 1.

FIG. 8 is a more detailed block diagram of a parser engine 800 that is one embodiment of the parser engine 110 of FIG. 1. The parser engine 800 includes a pre-match buffer 810, disambiguating logic 820, and a pre-match filter 830. The pre-match buffer 810 includes a data input to receive characters (CHAR) of the input string, a first output to provide characters of the input string to disambiguating logic 820, a second output to provide a parsed input string (PIS) to a first input of pre-match filter 830, and includes a control input to receive control signals (CTRL) from disambiguating logic 820. The pre-match filter 830 includes a second input to receive an activation signal (ACTV) from disambiguating logic 820, and includes an output to provide the filtered input string (FIS) to search engine 120 (see also FIG. 1).

The pre-match buffer 810 is configured to receive and store characters of the input string until the disambiguating logic 820 can determine whether the characters should be forwarded to search engine 120 or discarded as not relevant to any search operation performed downstream. Thus, for some embodiments, the pre-match buffer 810 can be embodied as a first-in-first-out (FIFO) memory. The disambiguating logic 820 includes a category database 822 for storing a number of category rules that can be used to extract relevant portions from the input string and/or to determine which rules in the rules database 130 should be selected for the subsequent search operation performed by search engine 120. For one example, if the rules database 130 stores a set of rules pertaining to the URI field of an HTTP request message, then the category database 822 can store a corresponding set of category rules that allows the disambiguating logic 820 to determine whether a set of characters and/or string segments in the pre-match buffer 810 are associated with the HTTP URI field.

For some embodiments, the disambiguating logic 820 compares each character CHAR of the input string stored in the pre-match buffer 810 with the rules stored in the category database 822, and in response thereto generates the activation signal (ACTV) and outputs a control message CTRL to pre-match buffer 810. The CTRL message instructs the pre-match buffer 810 to either (1) hold the characters therein or (2) output the characters as a parsed input string (PIS) to the pre-match filter 830. For some embodiments, the CTRL message can also instruct the pre-match buffer 810 to discard a selected number of input characters stored therein. The pre-match filter 830 selectively forwards the characters of the PIS as the filtered input string (FIS) to search engine 120 (see also FIG. 1) in response to the activation signal ACTV generated by the disambiguating logic 820. For some embodiments, the pre-match filter 830 functions as a logic gate to selectively forward the PIS as the FIS if the activation signal ACTV is asserted. Accordingly, if the activation signal ACTV is de-asserted, the pre-match filter 830 does not forward any characters from the PIS to the search engine 120 as the filtered input string (FIS). For other embodiments, the ACTV signal can be embedded within the FIS and used as the trigger signals PTRG to selectively enable one or more components 221-223 of search engine 120.

If the disambiguating logic 820 determines that a particular character CHAR or sequence of characters does not match any rule stored in the category database 822, the disambiguating logic 820 can instruct the pre-match buffer 810 to forward the corresponding character(s) to pre-match filter 830, and can de-assert the ACTV signal so that the characters are not forwarded as the FIS to the search engine 120. Conversely, if the disambiguating logic 820 determines that a particular character CHAR or sequence of characters matches at least part of one or more rules stored in the category database 822, the disambiguating logic 820 can instruct the pre-match buffer 810 to "hold" the character(s) until it can be determined whether one or more pre-match conditions are met (e.g., whether or not the held characters are in fact relevant to the requested search operation to be performed in search engine 120).

The URI field of an HTTP request message can be identified using a number of techniques. For example, the data fields 701-703 of the HTTP request message 700 are separated by whitespaces 704*a* and 704*b*, as discussed above with respect to FIGS. 7A and 7B. Thus, although the URI field 702 can include any number and/or combination of ASCII-encoded characters, it is bounded by a first whitespace 704*a* and a second whitespace 704*b* (note that there are no whitespaces in the actual URI field 702). Accordingly, for one embodiment, the category database 822 can store the regular expression R5="[ASCII]+[whitespace]HTTP", which can be used to detect the presence (and determine the location) of the URI field within the input string. More specifically, an input string will match the regular expression R5="[ASCII]+[whitespace]HTTP" if the input string contains one or more occurrences of any ASCII character, followed by a whitespace, followed by the string segment "HTTP". Thus, if the input string matches R5, then the portion of the input string prior to the whitespace and "HTTP" contains a URI field of interest.

An exemplary operation of parser engine 800 searching input string 700 for a match with regular expression R5="[ASCII]+[whitespace]HTTP" is described below with respect to FIGS. 9A and 9B. First, the pre-match buffer 810 is loaded with the input string "GET up.html HTTP/1.1," and the disambiguating logic 820 is configured to search the input string 700 for the regular expression R5="[ASCII]+[whitespace]HTTP". In operation, the disambiguating logic 820 reads the characters of input string 700 from pre-match buffer 810 sequentially (e.g., from left to right) to determine whether the input string contains a portion (e.g., a sequence of characters) that matches the regular expression R5. More specifically, the disambiguating logic 820 first reads the character "G" from input string 700. Because CHAR=G is a valid ASCII character (and thus matches the ASCII character class portion of the regular expression R5), the disambiguating logic 820 instructs the pre-match buffer 810 to hold this character. The disambiguating logic 820 then reads the next characters "E" and "T" from the input string 700 and compares them with the regular expression R5. Because both "E" and "T" are also valid ASCII characters (and thus match the ASCII character class of the regular expression R5), disambiguating logic 820 instructs the pre-match buffer 810 to hold these characters as well.

Upon detecting the whitespace 704*a* immediately following "GET" in the input string 700, which matches the "[whitespace]" in regular expression R5, disambiguating logic 820 does not yet know whether the string segment "GET" belongs to the URI field 702 or to some other data field (e.g., method field 701) that may not be relevant to any search performed by downstream search engine 120. Thus, in response to the "whitespace" match between the input string 700 and the regular expression R5, disambiguating logic 820 sets a pre-match pointer (PTR_PM) to the location of the whitespace 704*a* in the input string, and then reads ahead (e.g., reads subsequent characters in the input string) to determine whether the held characters are in fact relevant to the URI field of an HTTP request message (e.g., whether the held characters identify a URI or pathname of a website). Thus, in accordance with the present embodiments, the pre-match pointer PTR_PM is used to mark the location of characters in the pre-match buffer 810 that are at least potentially relevant to search operations performed downstream in search engine 120.

Then, the disambiguating logic 820 reads ahead and compares subsequent characters of the input string with the regular expression R5 to determine whether a pre-match condition is met with respect to the held characters. If so, then only the characters on "hold" (e.g., before the whitespace) are forwarded from the pre-match buffer 810 to the pre-match filter 830. If not, then the held characters are discarded and not forwarded to the pre-match filter 830. This ensures that only characters relevant to the URI search operation are forwarded to the search engine 120 and/or that no more characters are discarded from the pre-match buffer 810 than necessary.

For some embodiments, the disambiguating logic 820 can be configured to read ahead by four characters in the input string (e.g., because it is looking for the 4-character sequence "HTTP" that signals the start of the version field and, thus, the end of the URI field). Of course, for other embodiments, the disambiguating logic 820 can be configured to read ahead by any suitable number of characters in the input string (e.g., depending on the length of the particular character sequence of interest).

Referring again to FIG. 9A, for the present example, the 4-character active text following the first whitespace 704*a* indicated by PTR_PM is "up.h", which does not pertain to an HTTP version field (e.g., because the HTTP version field starts with "HTTP", not with "up.h"). Thus, because the input character sequence "up.h" is not a version field, it is part of the preceding field of the input string, namely, the URI field. Similarly, if the input character sequence "up.h" is part of the URI field, then the preceding input character sequence "GET" is part of the method field (e.g., because the method field precedes the URI field in an HTTP request message, for example, as depicted in FIG. 7A). Thus, in response to the mismatch between "up.h" and the "HTTP" portion of regular expression R5, disambiguating logic 820 de-asserts the activation signal ACTV and instructs the pre-match buffer 810 via CTRL to discard all of the held characters of the input string prior to and including the location indicated by PTR_PM. More specifically, the pre-match buffer 810 discards the held input character sequence "GET", which of course is not part of the URI field and thus deemed not relevant to downstream search operations performed by search engine 120.

After the held characters are discarded from the pre-match buffer 810, the disambiguating logic 820 continues reading characters from the input string and comparing them to regular expression R5 in the same manner described above. The next input character sequence "up.html" matches the "[ASCII]" character class of the regular expression R5. Subsequently, when a match is detected between the second whitespace 704*b* and the "[whitespace]" portion of regular expression R5, the disambiguating logic 820 moves PTR_PM to the location of the whitespace 704*b* immediately following the string segment "up.html", and instructs the pre-match buffer 810 to hold these characters (e.g., because they are prior to the input character location indicated by PTR_PM), as depicted in FIG. 9B.

The disambiguating logic 820 then reads ahead a number of subsequent characters in the input string to determine whether these held characters are in fact relevant to an HTTP URI field. For the present example, the 4-character active text following the whitespace 704*b* indicated by PTR_PM is "HTTP", which pertains to the HTTP version field 703 because the input characters "HTTP" match the version field "HTTP" contained in the regular expression R5. Thus, in response to the match between input characters "HTTP" and the "HTTP" portion of regular expression R5, disambiguating logic 820 instructs the pre-match buffer 810 via CTRL to forward the held characters "up.html" to the pre-match filter 830, and asserts the activation signal ACTV. In response to the asserted state of ACTV, the pre-match filter 830 forwards the held characters string "up.html" as the FIS to search engine 120. In this manner, search engine 120 receives only the input characters pertaining to the field of interest (e.g., the URI field), while other portions of the input string (e.g., the whitespace 704*b*) are not provided to search engine 120.

Figure 9A:
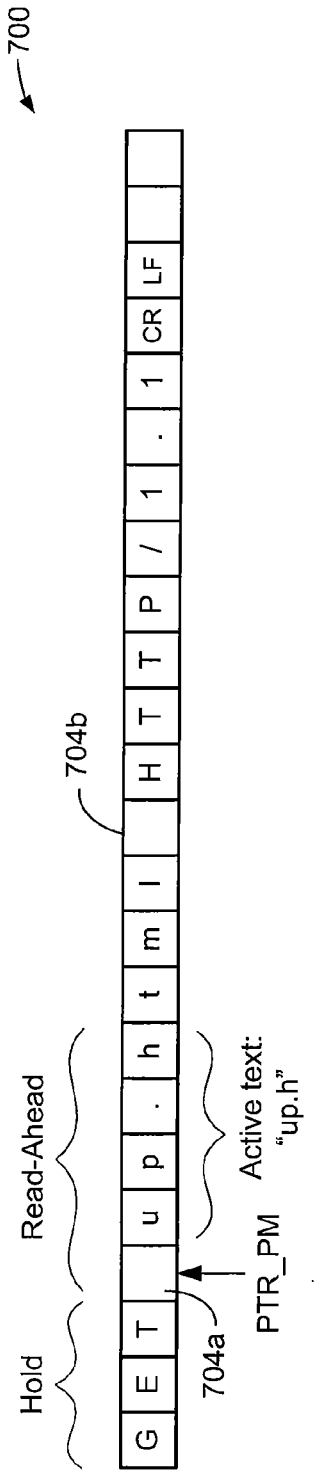
FIGS. 9A-9B illustrate one exemplary operation of the parser engine of FIG. 8.
Figure 9B:
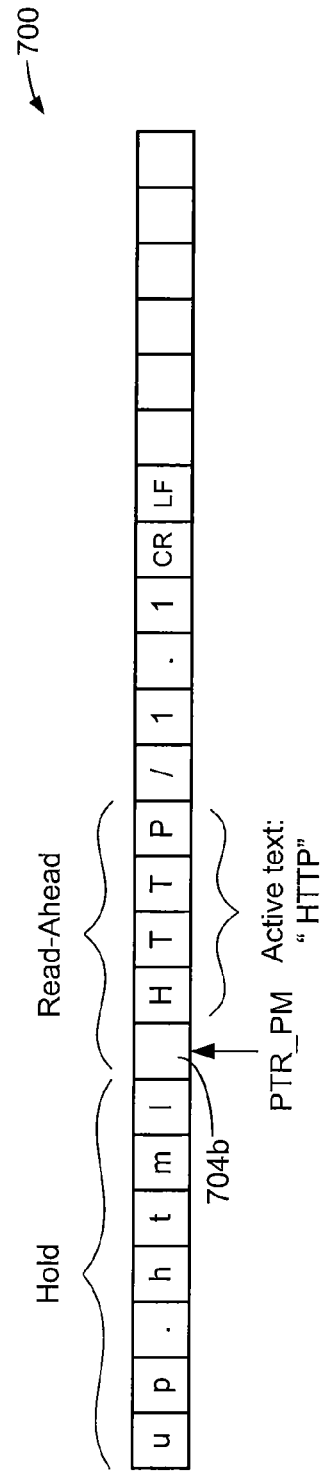

Note that when the disambiguating logic 820 determined that the string segment "GET" does not belong to the URI field 702, it had already examined the next 4 input characters "up.h" (e.g., as depicted in FIG. 9A). Thus, for some embodiments, rather than re-examine these input characters after the pre-match pointer PTR_PM is set to a new location, the disambiguating logic 820 can instruct the pre-match buffer 810 to hold any matching (e.g., ASCII) characters it identifies during the "read-ahead" stage so that the disambiguating logic 820 can continue examining characters of the input string where it left off (e.g., beginning with the character "t").

As described above, the parser engine 800 parses the input string so that only selected portions of the input string (e.g., deemed to be relevant to an associated search operation) are forwarded to the search engine 120, thereby not only reducing search times but also increasing accuracy by reducing the chances of false match conditions (e.g., matches between non-relevant portions of the input string and rules stored in the rules database 130). Accordingly, the rules in the category database 822 can be programmed to be as broad or as specific as a user desires. Thus, for example, the parser engine 800 can be configured to identify and forward both the method field and the URI field of an HTTP request message to search engine 120. Alternatively, the parser engine 800 can be configured to identify and forward only specific portions of the URI field of the HTTP request message to search engine 120.

As mentioned above, the category database 822 stores a plurality of rules that can be used to identify and extract relevant portions of the input string for subsequent search operations performed in search engine 120. For some embodiments, the category database 822 can store a plurality of rules for which at least one rule is a subset of another rule. For such embodiments, if the parser engine 800 outputs a pre-matched substring as FIS to search engine 120 as soon as a match to the first rule is identified, then the search engine 120 may never receive any substrings that match the second rule.

Figure 10A:
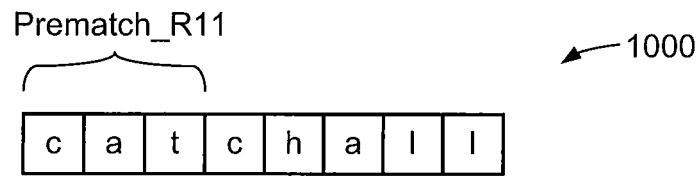
FIGS. 10A-10C illustrate another exemplary operation of the parser engine of FIG. 4

For example, suppose the category database 822 stores three regular expressions or rules R11="cat", R12="catch", and R13="all", where rule R11="cat" is a subset of rule R12="catch". If the pre-match buffer 810 receives an input string "catchall", as depicted in FIG. 10A, then the disambiguating logic 820 (not shown in FIG. 10A for simplicity) may determine that a pre-match condition with R11 is met after reading the first three characters of the input string. However, if the disambiguating logic 820 instructs the pre-match buffer 810 to immediately forward the pre-matched input characters "cat" to pre-match filter 830, then the remaining characters in the pre-match buffer 810 ("chall") will not match either rules R11 or R12 stored in the category database 822, thereby erroneously causing the search engine 120 to never receive the substring "catch" that matches rule R12="catch".

Figure 10B:
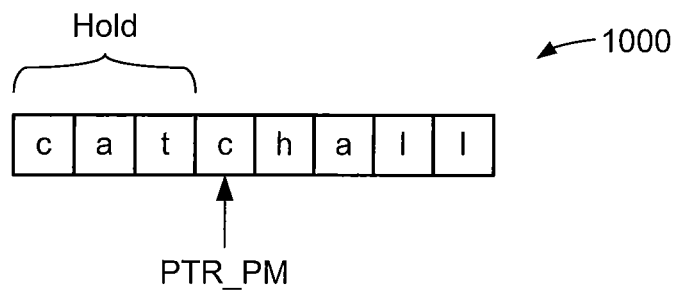

Thus, for some embodiments, the disambiguating logic 820 can be configured to instruct the pre-match buffer 810 to hold the characters of a pre-matched substring until the disambiguating logic 820 can read ahead additional input characters to unambiguously determine whether all potential matching conditions of the pre-matched substring are identified. For example, FIG. 10B depicts the disambiguating logic 820 instructing the pre-match buffer 810 to hold the pre-match characters "cat", and then moving the pre-match pointer PTR_PM to the character position immediately following the pre-matched substring. Then, the disambiguating logic 820 reads the next character ("c") of the input string (e.g., indicated by PTR_PM). Note that it is ambiguous whether the current input character "c" corresponds to the fourth character of R12 or to the first character of R11. Thus, the disambiguating logic 820 instructs the pre-match buffer 810 to hold this character while additional input characters are read and compared with R11-R13. Here, note that because another pre-match condition has not yet been met, the disambiguating logic 820 does not move PTR_PM.

Figure 10C:
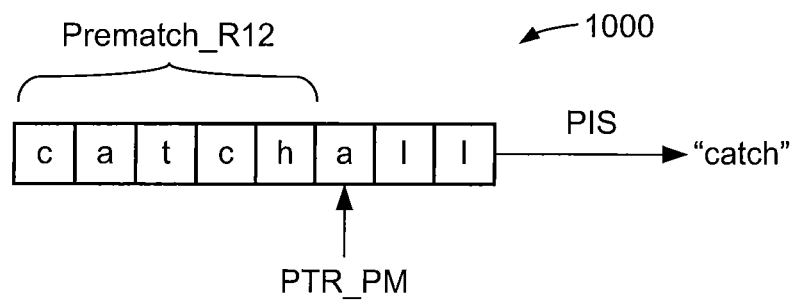

After the disambiguating logic 820 reads the next character ("h") of the input string, it identifies a match with R12, and therefore moves the pre-match pointer PTR_PM to the character position immediately following the second pre-matched substring "catch", as shown in FIG. 10C. The disambiguating logic 820 then instructs the pre-match buffer 810 to hold the character "h" while it continues to read ahead and examine additional characters in the input string. Finally, after detecting a "no match" condition after reading the next character ("a") of the input string, the disambiguating logic 820 can determine that it has unambiguously identified all of the regular expressions (R11 and R12) that the first pre-matched string segment "cat" can potentially match. In response thereto, the disambiguating logic 820 instructs the pre-match buffer 810 to output the matching substring "catch" to the pre-match filter 830, and asserts the activation signal ACTV. In this manner, the search engine 120 is able to detect match conditions between the input string and R11-R12.

Thereafter, the disambiguating logic 820 sequentially reads the next 3 characters ("all") of the input string stored in the pre-match buffer 810, and holds the characters "all" until a pre-match condition with R13 is identified. Then, the disambiguating logic 820 instructs the pre-match buffer 810 to output the matching substring "all" to the pre-match filter 830, and again asserts the activation signal ACTV. In this manner, the search engine 120 is able to detect match conditions between the input string and R13.

Figure 11A:
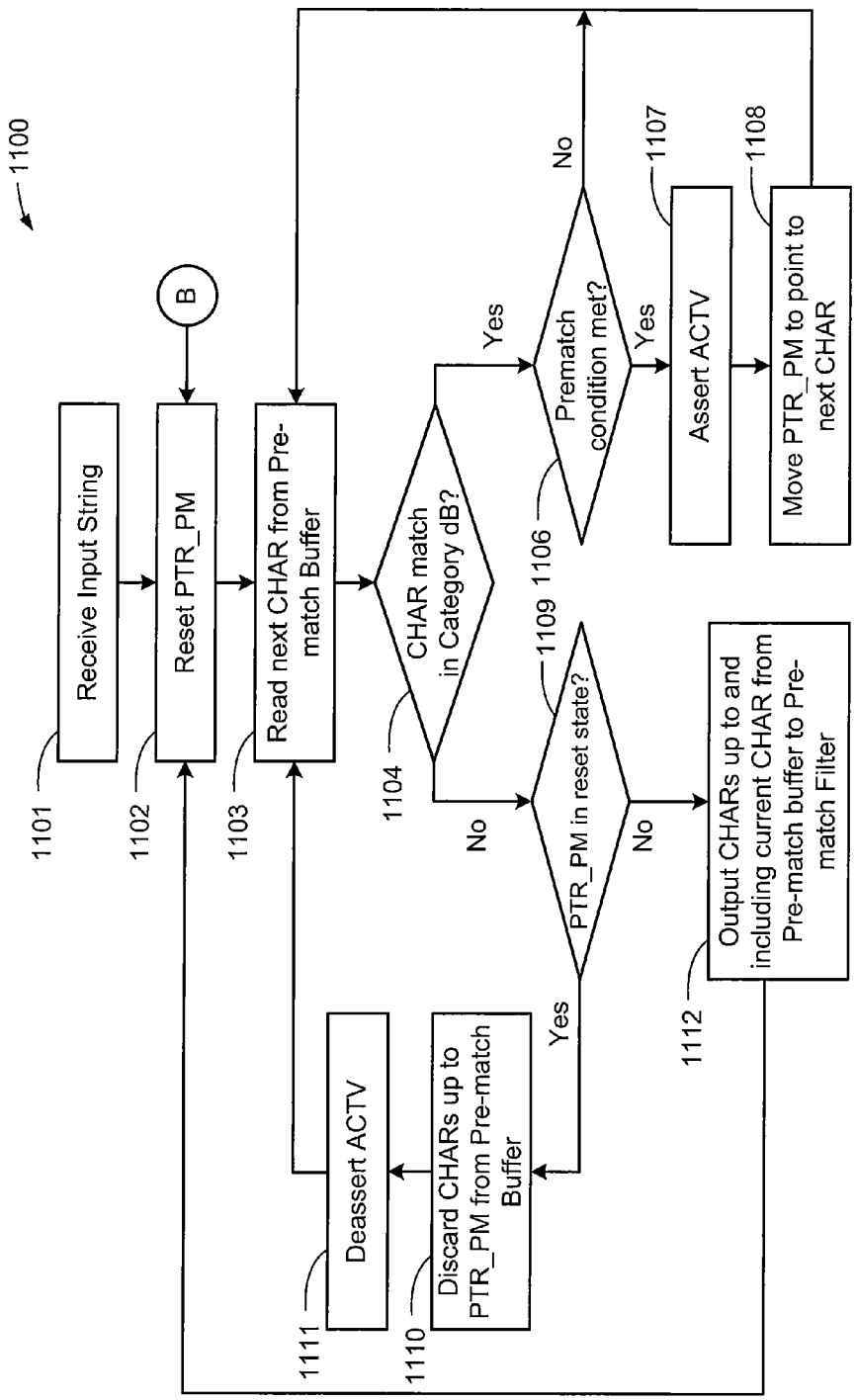
FIG. 11A is a flowchart illustrating a parsing operation of the parser engine of FIG. 8, according to some embodiments.

FIG. 11A shows a flowchart 1100 depicting an exemplary parsing operation performed by the parser engine 800 of FIG. 8. First, the parser engine 800 receives an input string and stores it in the pre-match buffer 810 (1101). Then, the disambiguating logic 820 resets the location (e.g., the buffer address) pointed to by the pre-match pointer PTR_PM (1102). Then, the disambiguating logic 820 reads the first character of the input string from the pre-match buffer 810 (1103). The disambiguating logic 820 compares the character (e.g., as the current character) with the category rules stored in the category database 822 to determine whether the current character matches a portion of one of the category rules (1104).

If there is a match with one (or more) of the category rules, as tested at 1104, then the disambiguating logic 820 determines whether a pre-match condition is met (1106). Thus, if the current character matches the last state for one of the rules stored in the category database 822, then a pre-match condition with that rule is met. For example, referring also to FIG. 9A, the character "t" in the input substring "catch" triggers a pre-match condition for R11="cat". Then, if a pre-match condition is met, the disambiguating logic 820 asserts the activation signal ACTV (1107), and moves PTR_PM to point to the location of the next character in the pre-match buffer 810 (1108). After moving the PTR_PM, the disambiguating logic 820 then reads the next character in the pre-match buffer 810 (1103). Conversely, if no pre-match condition is met, as tested at 1106, then the disambiguating logic 820 reads the next character in the pre-match buffer 810 (1103).

If the disambiguating logic 820 determines that the current character of the input string does not match a corresponding character of one or more rules stored in the category database 822, as tested at 1104, a subsequent determination is made as to whether the PTR_PM is in the reset state (1109). If the PTR_PM is in the reset state, thus indicating that no pre-match condition has been met, the disambiguating logic 820 instructs the pre-match buffer 810 to discard all characters stored therein up to and including the current character (1110), and the ACTV signal is de-asserted (1111). The disambiguating logic 820 then reads the next character from the pre-match buffer 810 (1103).

If the PTR_PM is not in the reset state, as tested at 1109, then the disambiguating logic 820 instructs the pre-match buffer 810 to output all characters up to (but not including) the location pointed to by PTR_PM (1112). The disambiguating logic 820 then resets the PTR_PM (1102), and reads the next character in the pre-match buffer 810 (1103).

Thus, in accordance with the present embodiments, the parsing operation 1100 identifies and forwards to search engine 120 only the portions of an input string that are relevant to search operations performed by the search engine 120. Furthermore, the parsing operation 1100 continues to compare characters of the input string with the rules of the category database 822 until no further match is detected with any of the rules. In this manner, the parsing operation 1100 ensures that the characters of the input string data are held in the pre-match buffer 810 long enough so that all possible matching rules can be unambiguously identified for any given portion of the input string.

For some embodiments, one or more rules in the category database 822 may include characters that are not found in any of the rules stored in the rules database 130. For example, referring again to FIGS. 9A-9B, the disambiguating logic 820 can be configured to search for a whitespace 704 to identify and locate the URI field of an HTTP request message. Although such characters may be relevant to the parsing operation performed by the parser engine 800, they are not relevant to any search operation performed by downstream search engine 120. Thus, for some embodiments, such characters are not included as part of the filtered input string FIS by the parser engine 800.

Figure 11B:
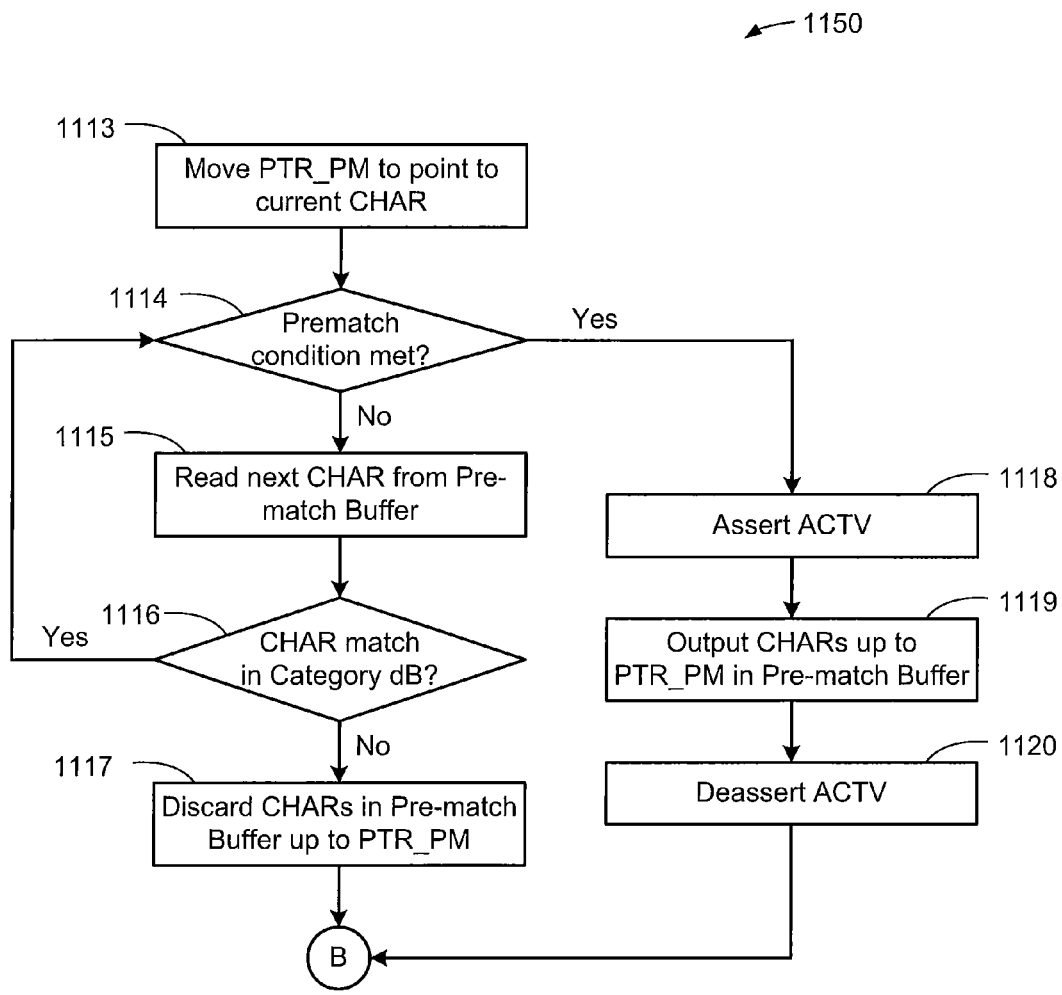
FIG. 11B is a flowchart illustrating a read-ahead operation of the parser engine of FIG. 8, according to some embodiments.

For example, if the parser engine 800 determines that a character of the input string matches one or more rules in the category database 822 (1104), but is not contained in any of the rules stored in the rules database 130, the parser engine 800 may subsequently perform a "read-ahead" operation, as depicted in FIG. 11B. The read-ahead operation 1150 of FIG. 11B begins by indexing the PTR_PM to point to the location of the current character in the pre-match buffer 810 (1113). The disambiguating logic 820 then determines whether a pre-match condition has been met (1114).

If no pre-match condition is met, as tested at 1114, then the disambiguating logic 820 reads the next character of the input string from the pre-match buffer 810 (1115). Then, the disambiguating logic 820 determines whether this character matches a corresponding character of one or more rules stored in the category database 822 (1116). If no match is found, the disambiguating logic 820 instructs the pre-match buffer 810 to output all of the characters up to (but not including) the location indicated by PTR_PM (1117), and subsequently terminates the read-ahead operation. Referring again to FIG. 11A, the disambiguating logic 820 resets the PTR_PM (1102), and then reads the next character in the pre-match buffer 810 (1103). Conversely, if a match condition is found, as tested at 1116, the disambiguating logic 820 then makes a subsequent determination as to whether a pre-match condition is met (1114). The disambiguating logic 820 continues to read ahead in the pre-match buffer 810 (e.g., steps 1114-1116) until either a no-match condition is determined (1116), or a pre-match condition is met (1114).

If a pre-match condition is found at 1114, then the disambiguating logic 820 asserts the activation signal ACTV (1118), and instructs the pre-match buffer 810 to output all of the characters up to (but not including) the location currently pointed to by PTR_PM (1119). Then, the disambiguating logic 820 de-asserts the activation signal ACTV (1120), and exits the read-ahead operation. Referring again to FIG. 11A, the disambiguating logic 820 then resets the PTR_PM (1102), and reads the next character in the pre-match buffer 810 (1103).

Thus, according to present embodiments, the read-ahead operation 1150 allows the parser engine 800 to determine whether a subset of characters in the input string matches one or more rules in the category database 822 without forwarding to search engine 120 any input characters that are not relevant to search operations for rules stored in the rules database 130. More specifically, the parser engine 800 can use the pre-match condition to analyze the next field of an HTTP request message to determine whether the pre-matched substring corresponds to a field of interest (e.g., to the URI field of the HTTP request message) to be searched for by the downstream search engine 120 without passing the next field to the downstream search engine 120.

Figure 12A:
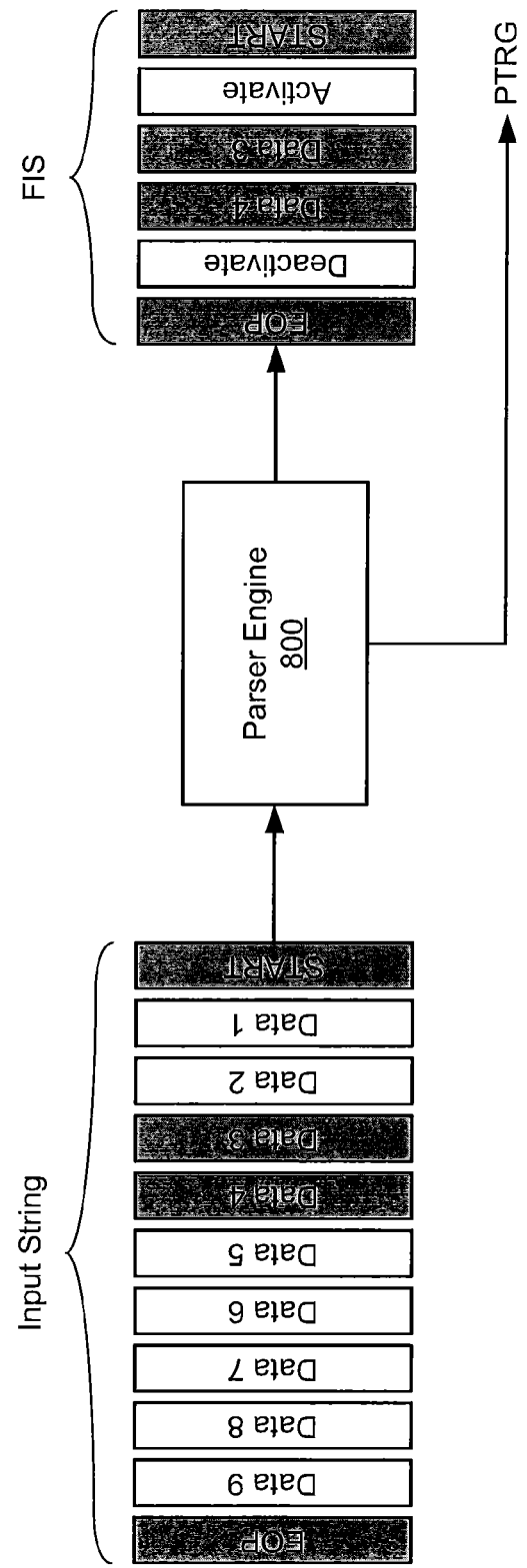
FIG. 12A illustrates a first exemplary operation of the parser engine of FIG. 8 to selectively activate and/or deactivate one or more components of a search engine in accordance with some embodiments.

As mentioned above, for some embodiments, the parser engine 800 can generate a number of parser trigger signals (PTRG) that selectively enable corresponding engine components of the search engine 120 to search the filtered input string for one or more sets of rules selectively loaded from rules database 130 in response to the rule select signal SEL_RS. For example, FIG. 12A illustrates an exemplary operation of the parser engine 800 configured to selectively activate and/or deactivate one or more components of search engine 120 for search operations. More specifically, the parser engine 800 receives an input string including a start frame, a series of 9 data bytes (DATA1-DATA9), and an end of packet (EOP) frame. In response thereto, the parser engine 800 outputs a filtered input string FIS including only 2 bytes (DATA3-DATA4) that are relevant to downstream search operations performed by search engine 120. For some embodiments, the parser engine 800 can also provide information signaling the start and end of the data packet (START/EOP). Further, FIG. 12A depicts the filtered input string FIS as including embedded trigger signals represented as "activate" and "deactivate" instruction frames that can be used to activate and de-activate, respectively, one or more search components 221-223 of the downstream search engine 120. For example, the activate signal can enable selected search components 221-223 of search engine 120 to search for the data packets DATA3-DATA4, and after the search operation, the deactivate signal can disable those components 221-223 of search engine 120.

For some embodiments, the parser engine 800 can minimize power consumption of the search engine 120 by generating a parser trigger signal (PTRG) that selectively enables the search engine 120 to begin searching the filtered input string (FIS) for rules stored in the rules database 130. Thus, when the PTRG signal is not asserted (e.g., when the filtered input string is not ready for searching), the search engine 120 does not perform search operations on the input string, thereby consuming a minimal amount of power. Conversely, when the PTRG signal is asserted, the search engine 120 is enabled to begin searching the input characters provided by parser engine 800 for matches with rules stored in the rules database 130.

Referring also to FIG. 8, for some embodiments, the pre-match filter 830 can be configured to combine the activation signal ACTV generated by the disambiguating logic 820 with the PIS data output from the pre-match buffer 810 to generate a filtered input string (FIS) having the trigger signal PTRG embedded therein. For such embodiments, search engine 120 can be selectively enabled to perform regular expression search operations in response to the embedded trigger signal PTRG. The search engine 120 can later de-activate itself after completion of search operations on the filtered input string (FIS).

Figure 12B:
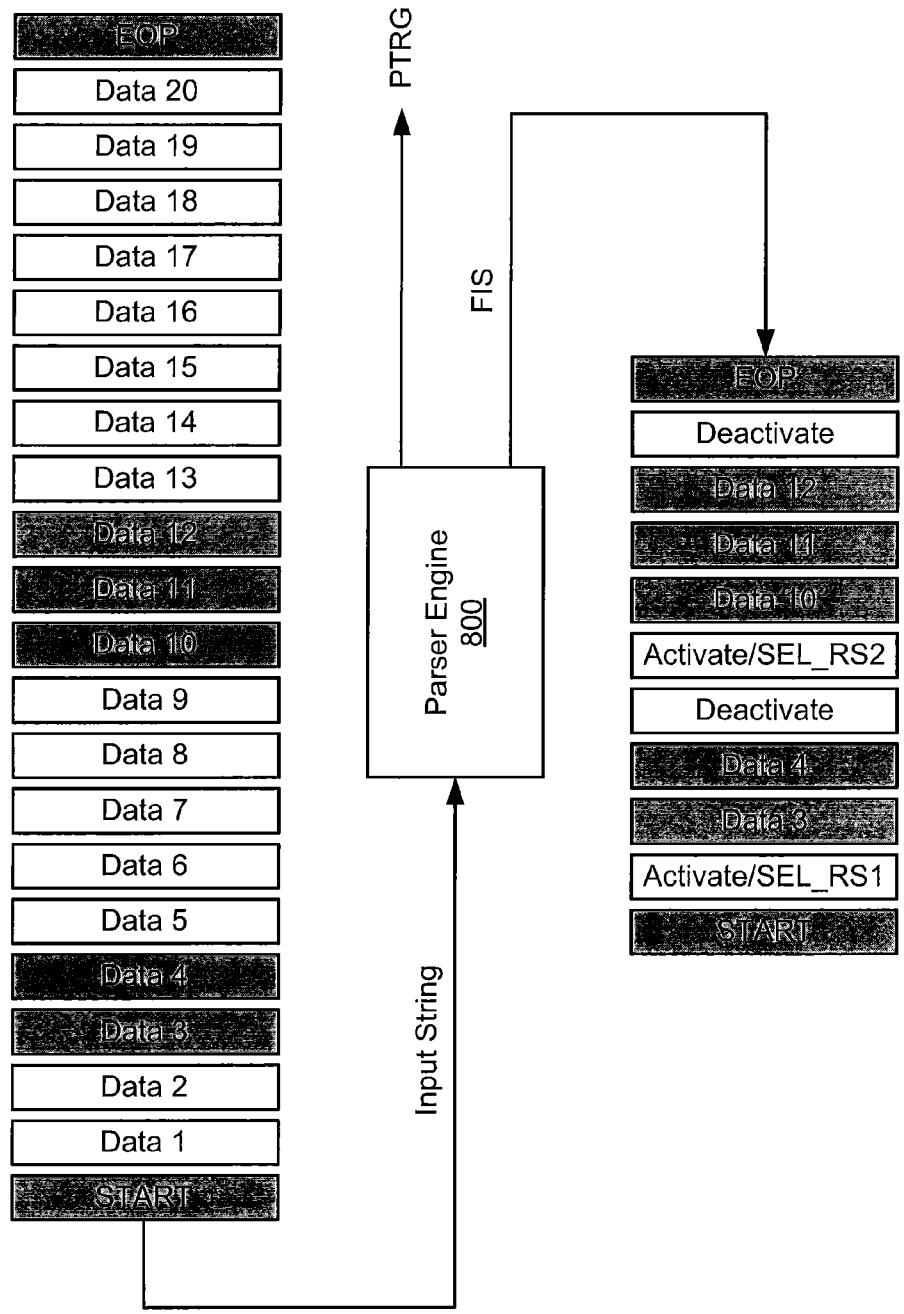
FIG. 12B illustrates a second exemplary operation of the parser engine of FIG. 8 to selectively activate and/or deactivate one or more components of a search engine in accordance with other embodiments.

More specifically, FIG. 12B depicts an exemplary operation of the parser engine 800 to selectively enable and/or disable one or more engine components of search engine 120 to search the filtered input string (FIS) for corresponding sub-groups of rules stored in the rules database 130. The parser engine 800 receives an input string including a start frame, a series of 20 data bytes (DATA1-DATA20), and an end of packet (EOP) frame. In response thereto, parser engine 800 outputs a filtered input string (FIS) that includes only those bytes (DATA3-DATA4 and DATA10-DATA12) that are relevant to search operations for selected sets or sub-groups of rules stored in the rules database 130. For the exemplary embodiment of FIG. 12B, the first set of data bytes (DATA3-DATA4) pertains to a first search operation, and the second set of data bytes (DATA10-DATA12) pertains to a second search operation that is different from the first search operation. For example, DATA3-DATA4 can correspond to a URI field of an HTTP request packet (e.g., for restricting access based on the requested network resource), while DATA10-DATA12 can correspond to a header field of the HTTP request packet (e.g., for determining a next-hop address or performing packet classification functions).

As mentioned above, for some embodiments, the rules database 130 of FIG. 1 can store a plurality of sets of rules for which each rule set can be used for a different requested search operation. For example, one rule set can include rules associated with the URI field of an HTTP request packet, while another rule set can include rules associated with the HTTP request packet header field. Because it would be a waste of resources to apply the rules associated with the header field when searching the URI field of a filtered input string FIS, and likewise a waste of resources to apply the rules associated with the URI field when searching the packet header field of the filtered input string FIS, the parser engine 800 can be configured to output a rule set select signal (e.g., SEL_RS1 or SEL_RS2) as part of the filtered input string FIS when data pertaining to that particular rule set is available for search. This enables the downstream search engine 120 to selectively apply only the relevant rule set to search operations involving particular data subsets of the filtered input string FIS.

Because the URI field of an HTTP request message follows a text protocol that has a relatively unstructured (e.g., free form) format, malicious users can obfuscate an attack using several techniques including, for example, (1) encoding characters of the URI field using hexadecimal notations and (2) including directory up-level commands (e.g., "/../") into the URI field. Because of the large number of encoding permutations, it is difficult (if not impossible) to write a set of regular expression rules that can detect all possible encoding variations associated with an attack or authorized access attempt. Thus, in accordance with some embodiments, the content search system of FIG. 1 can be modified to include a normalizer engine that normalizes (e.g., un-encodes) the characters pertaining to the URI field (and other fields) into a standardized character format that can be adequately covered by a set of regular expression rules.

Figure 13:
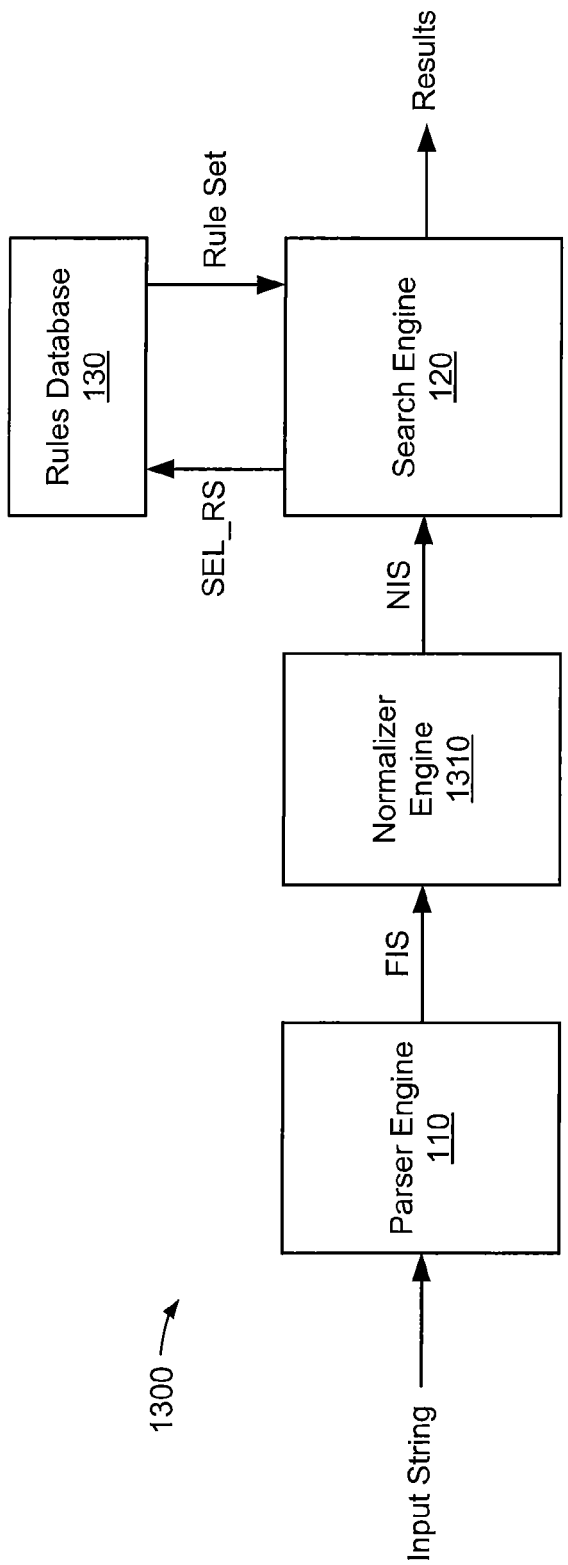
FIG. 13 shows a content search system further including a normalizer engine in accordance with some embodiments.

For example, FIG. 13 shows a content search system 1300 that is another embodiment of the content search system 100 of FIG. 1. The content search system 1300 includes all the elements of the content search system 100 of FIG. 1, with the addition of a normalizer engine 1310 in the search pipeline inserted between parser engine 110 and the search engine 120. The normalizer engine 1310, which includes an input to receive the filtered input string (FIS) from the parser engine 110 and an output to provide a normalized input string (NIS) to search engine 120, can be used to transform (e.g., selectively un-encode) data in the FIS to a normalized format to generate the NIS. For one example, version 2 of the HTTP protocol allows users to represent characters in the URI field using a hexadecimal (hex) format instead of the standard ASCII-encoded binary format. More specifically, a user can represent an ASCII character as the % symbol followed by the hex representation of the ASCII code, where the character "a" can be represented as %61, the character "b" can be represented as %62, the character "c" can be represented as %63, the character "d" can be represented as %64, and so on. Thus, because malicious users can use this alternate hex format to represent illegal characters or malicious text in a manner that can evade regular expressions designed to detect such illegal characters or malicious text represented in the ASCII-encoded format, the normalizer engine 1310 can be used to un-encode or normalize the URI field so that the regular expression rules can be used in a uniform manner to detect such illegal characters or malicious text. The process of normalizing text represented in hex format is referred to herein as percent (i.e., %) decoding.

For another example, malicious users can include up-level commands (e.g., "/../") in the pathname of a URI field to gain unauthorized access to a web server's system-level directories and thereafter improperly retrieve password files, system level files, source code, and/or other information that is not part of the requested web site but rather is used by the system level of the web server. More specifically, each pair of dots "/../" in the pathname b/x/y/../../, which means "go up" a directory level in the UNIX programming language, can be used to gain unauthorized access to sensitive system level files associated with the web server. For this example, the normalizer engine 1310 can normalize the pathname "b/x/y/../../" to just "b/" by deleting unnecessary instances of the pairs of dots "/../". Otherwise, if the pathname "b/x/y/../../" is not normalized, the pathname can be used to potentially access files on the webserver that are not relevant to the webserver itself but rather include sensitive system level files. Further, a malicious user can disguise the up-level characters ("/../") by expressing them in hex format to evade regular expression rules that were written for ASCII-formatted requests.

Similarly, duplicate slashes in a pathname can also be deleted by the normalizer engine 1310. For example, the normalizer engine 1310 can be used to transform the URI pathname "www.example.com/foo//bar.html" to "www.example.com/foo/bar.html". If the above pathname is not normalized prior to being searched by search engine 120, search engine 120 may not recognize that the pathname corresponds to a rule and thus the rule may be defeated. For example, a rule written to detect an occurrence of a single slash (e.g., the rule "a/b") may not detect a match with a string that includes a double-slash (e.g., the string "a//b").

Because it is difficult for network administrators, firewalls, and other network security components to be aware of all techniques for unauthorized access and/or attacks, and because protocol definitions and parameters are continually evolving, for some embodiments, the normalizer engine 1310 can be programmable so that it can be dynamically updated to counter ever-evolving unauthorized access techniques.

Figure 14:
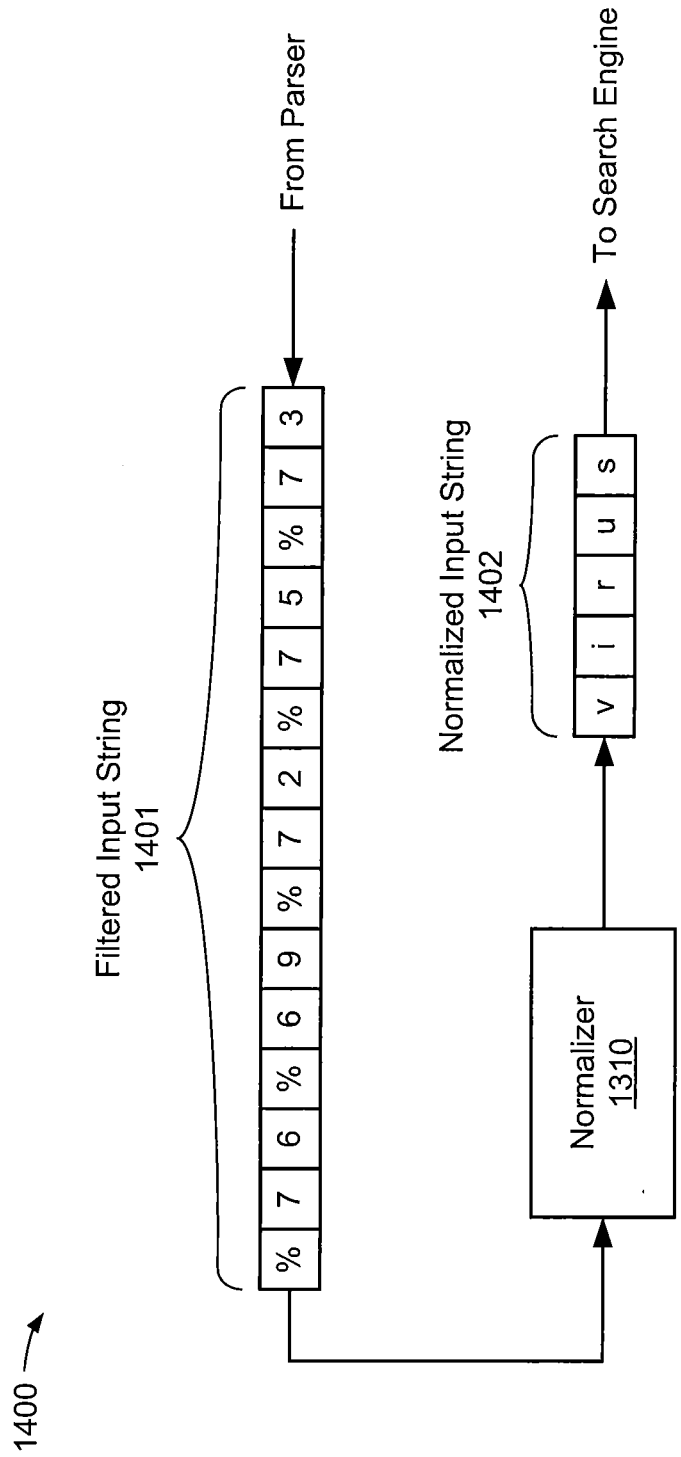
FIG. 14 illustrates an exemplary operation of the normalizer engine of FIG. 13.

FIG. 14 depicts an illustrative operation of normalizer engine 1310 for normalizing the hex-formatted URI pathname %76%69%72%75%73" into the character string "virus". Referring also to FIG. 13, the parser engine 110 detects the URI field, and then selectively activates the normalizer engine 1310 to normalize the URI field. Then, the normalizer engine 1310 receives the filtered input string 1401, un-encodes each character of the URI field, and then provides the normalized input string 1402 to search engine 120 for search operations.

Figure 15:
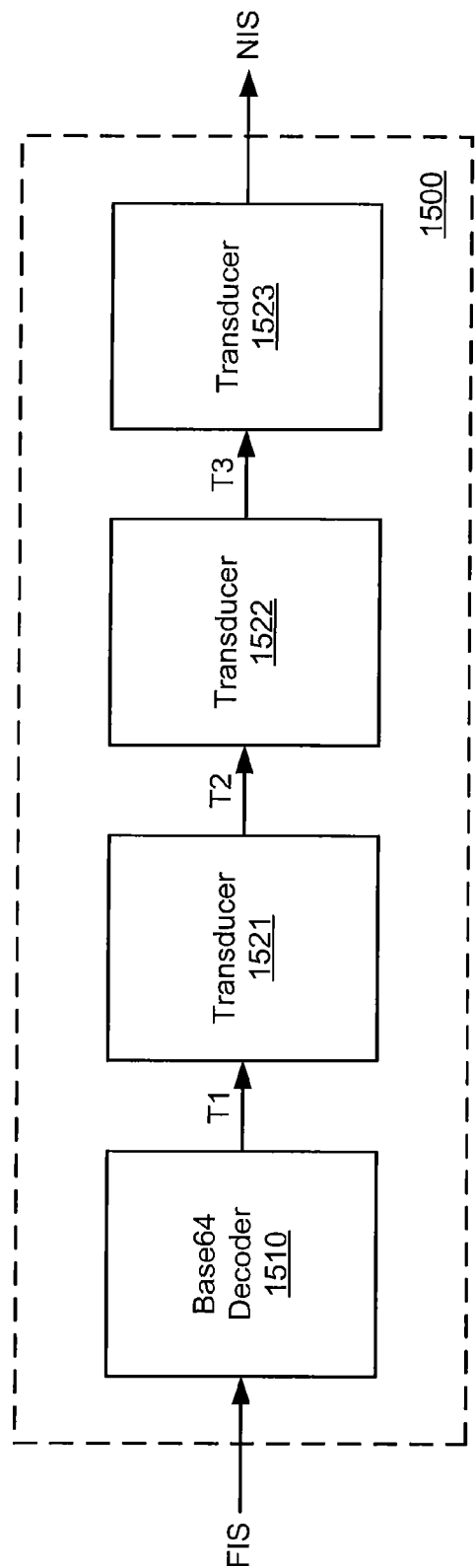
FIG. 15 is a more detailed block diagram of some embodiments of the normalizer engine of FIG. 13.

FIG. 15 shows a normalizer engine 1500 that is one embodiment of the normalizer engine 1310 of FIG. 13. The normalizer engine 1500 includes a base 64 decoder 1510 and 3 transducers 1521-1523 connected in series. The decoder 1510 is a hardware component that decodes the encoded text, and each of transducers 1521-1523 performs a field-specific normalization operation on the un-encoded text. For example, the first transducer 1521 can split the un-encoded URI field into sub-fields, and the second transducer 1522 and third transducer 1523 can each perform specific functions (e.g., percent decoding on the path sub-field, dot removal on the percent decoded path, removing duplicate slashes in the path, and adding a trailing slash where necessary) on corresponding sub-fields.

For some embodiments, the parser engine 110 can determine what type of normalization operation is appropriate, and in response thereto can selectively activate the individual components (e.g., decoder 1510 and 3 transducers 1521-1523) of the normalizer engine 1500. For example, some fields of an HTTP request message cannot be encoded, and therefore may not need to be normalized.

In the foregoing specification, the present embodiments have been described with reference to specific examples. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. For example, although specific examples are used herein to describe the operations of the parser, normalizer, and search engine, it should be noted that each of these system elements can be fully programmable to perform regular expression search operations in the general manner described with respect to any protocol and/or sub-groupings within a protocol. Furthermore, each of the parser, normalizer, and search engine can be implemented in hardware, in software, or as a combination of both hardware and software.

The present embodiments can be provided as a computer program product, or software, that may include a non-transitory machine-readable medium having stored thereon instructions. The machine readable medium may be used to program a computer system (or other electronic devices) to generate articles (e.g., wafer masks) used to manufacture the present embodiments. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

The machine-readable medium may store data representing an integrated circuit design layout that includes embodiments of the present invention. The design layout for the integrated circuit die may be generated using various means, for examples, schematics, text files, gate-level netlists, hardware description languages, layout files, etc. The design layout may be converted into mask layers for fabrication of wafers containing one or more integrated circuit dies. The integrated circuit dies may then be assembled into packaged components. Design layout, mask layer generation, and the fabrication and packaging of integrated circuit dies are known in the art; accordingly, a detailed discussion is not provided.

What is claimed is:

1. A content search system for determining whether an input string matches one or more rules, the content search system comprising:
    a hardware-implemented parser, having an input to receive the input string, to extract one or more selected portions of the input string to form a filtered input string and to generate a rule select signal in response to the selected portions of the input string;
    a rules database for storing a plurality of sets of rules;
    a hardware-implemented normalizer engine comprising
        an input configured to receive the filtered input string from the parser;
        a decoder configured to decode encoded text in the filtered input string and provide an un-encoded filtered input string as an output;
        a plurality of transducers, each transducer of the plurality of transducers configured to receive the un-encoded filtered input string, and configured to perform a different field-specific normalization operation; and
        an output configured to provide a normalized un-encoded filtered input string; and
    a search engine, having an input configured to receive the normalized un-encoded filtered input string, coupled to the rules database, configured to compare the normalized un-encoded filtered input string with a selected set of rules selected in response to the rule select signal;
    wherein the plurality of transducers are connected in series between the decoder and the search engine;
    wherein each transducer of the plurality of transducers is configured to be activated or deactivated in response to a signal from the parser.

2. The system of claim 1, wherein the input string comprises a request message, and the parser is configured to examine the input string to determine a protocol type of the request message.

3. The system of claim 2, wherein the request message is received from an external network processor, and the parser is configured to determine the protocol type of the request message without assistance from the external network processor.

4. The system of claim 1, wherein the input string comprises an HTTP request message, and the parser is configured to examine the input string to identify a Universal Resource Identifier (URI) field of the request message.

5. The system of claim 4, wherein the parser is configured to compare characters of the input string with the regular expression "[ASCII]+[whitespace]HTTP" to identify the URI field of the request message.

6. The system of claim 5, wherein the parser is to forward only characters of the input string that are associated with the identified URI field to the search engine as the filtered input string.

7. The system of claim 1, wherein the input string comprises a request message having multiple fields, and the parser is configured to search the input string for a whitespace to identify a boundary between the fields of the request message.

8. The system of claim 7, wherein upon detecting an occurrence of the whitespace in the input string, the parser extracts the whitespace from the input string and forwards remaining portions of the input string to the search engine.

9. The system of claim 1, wherein the parser is configured to generate a trigger signal in response to the one or more selected portions of the input string, and wherein the trigger signal is to selectively activate the search engine.

10. The system of claim 1, wherein the search engine comprises:
    a number of pipelined engines, each having a data input to selectively receive the filtered input string, and each having a control input configured to receive a corresponding trigger signal generated by the parser.

11. The system of claim 10, wherein a respective pipelined engine is to be activated for the compare operation only if the corresponding trigger signal is asserted by the parser.

12. The system of claim 10, wherein the pipelined engines comprise:
    a deterministic finite automaton (DFA) engine; and
    a non-deterministic finite automaton (NFA) engine.

13. The system of claim 12, wherein the DFA engine is configured to store first sub-expressions that comprise strings, and wherein the NFA engine is configured to store second sub-expressions having selected quantified character classes.

14. The system of claim 12, wherein the pipelined engines further comprise:
    a token stitcher configured to combine partial match results from the DFA engine and the NFA engine to generate a match result for the filtered input string.

15. The system of claim 14, wherein a respective rule includes an operator ".*" delegated to the token stitcher for processing.

16. The system of claim 1, wherein the parser comprises:

a pre-match buffer configured to selectively forward characters of the input string;

disambiguating logic, having an input configured to receive selected characters of the input string from the pre-match buffer, having a first output to generate a control signal, and having a second output to generate an activation signal; and a filter having a first input configured to receive the selectively forwarded characters from the pre-match buffer, having a second input configured to receive the activation signal, and having an output configured to generate the filtered input string in response to the selectively forwarded characters and the activation signal.

17. The system of claim 16, wherein the pre-match buffer is configured to selectively hold the characters of the input string in response to the control signal.

18. The system of claim 16, wherein the pre-match buffer is configured to selectively discard the characters of the input string in response to the control signal.

19. The system of claim 16, wherein the disambiguating logic is configured to determine whether characters of the input string stored in the pre-match buffer are to be discarded or forwarded to the search engine.

20. The system of claim 16, wherein the disambiguating logic further comprises:

a category database configured to store a plurality of category rules, wherein the category rules are to be compared with the input string to determine which portions of the input string correspond to a selected field of a message requesting a website.

21. The system of claim 1, wherein a first transducer of the plurality of transducers is configured to selectively remove up-level commands in a pathname provided within the un-encoded filtered input string.

22. The system of claim 1, wherein a first transducer of the plurality of transducers is configured to selectively remove duplicate slashes in a pathname provided within the un-encoded filtered input string.

23. The system of claim 1, wherein a first one of the plurality transducers is configured to split a URI field of the un-encoded filtered input string into a plurality of sub-fields, and each of the other transducers of the plurality of is configured to be activated individually in response to an activation signal to perform a field-specific normalization operation on the un-encoded filtered input string.

24. A method, performed by a content search system including a parser, a rules database memory device, a normalizer having a decoder and a plurality of transducers, and a search engine, for determining whether an input string matches one or more rules stored in the rules database, comprising:

extracting selected portions of the input string, using the parser, to form a filtered input string;

forwarding, by the parser, the filtered input string to the normalizer;

generating, by the parser, an activation signal for at least one of the plurality of transducers within the normalizer;

decoding the filtered input string, by the decoder, to produce an un-encoded filtered input string;

activating each transducer of the plurality of transducers for which an activation signal has been generated;

removing a field-specific obfuscation from the un-encoded filtered input string using the at least one activated transducer;

forwarding the normalized un-encoded filtered input string to the search engine;

generating a rule select signal, using the parser, in response to the selected portions of the input string;

selecting a set of rules in the rules database memory device in response to the rule select signal; and loading the selected set of rules from the rules database memory device into the search engine;

wherein each transducer of the plurality of transducers is configured to be activated or deactivated in response to a signal from the parser.

25. The method of claim 24, further comprising:

generating a trigger signal, using the parser, in response to the selected portions of the input string; and selectively enabling the search engine in response to the trigger signal.

26. The method of claim 24, wherein the input string comprises a request message, and the method further comprises:

examining the input string, using the parser, to determine a protocol type of the request message.

27. The method of claim 26, wherein the request message is received from an external network processor, and the parser is configured to determine the protocol type of the request message without assistance from the external network processor.

28. The method of claim 24, wherein the input string comprises an HTTP request message, and the method further comprises:

examining the input string, using the parser, to identify a Universal Resource Identifier (URI) field of the request message.

29. The method of claim 28, further comprising:

comparing characters of the input string, using the parser, with the regular expression "[ASCII]+[whitespace] HTTP" to identify the URI field of the request message.

30. The method of claim 29, further comprising:

forwarding only characters of the input string that are associated with the identified URI field to the normalizer as the filtered input string.

31. The method of claim 24, wherein the input string comprises a request message having multiple fields, and the method further comprises:

searching the input string for a whitespace to identify a boundary between the fields of the request message.

32. The method of claim 31, further comprising:

upon detecting an occurrence of the whitespace in the input string, extracting the whitespace from the input string; and forwarding remaining portions of the input string to the normalizer.

33. The method of claim 24, wherein the search engine comprises:

a number of pipelined engines, each having a data input to selectively receive the normalized un-encoded filtered input string, and each having a control input to receive a corresponding trigger signal generated by the parser.

34. The method of claim 33, wherein the pipelined engines comprise:

a deterministic finite automaton (DFA) engine; and a non-deterministic finite automaton (NFA) engine.

35. The method of claim 34, wherein the pipelined engines further comprise:

a token stitcher configured to combine partial match results from the DFA engine and the NFA engine to generate a match result for the filtered input string.

36. The method of claim 35, wherein a respective rule includes an operator ".*" delegated to the token stitcher for processing.

37. The method of claim 24, wherein the extracting further comprises:
- comparing the input string with a plurality of category rules stored in a category rules database to generate a control signal; and
- selectively discarding one or more characters from the input string to form the filtered input string in response to the control signal, wherein at least one of the discarded characters comprises a whitespace.

38. The method of claim 24, further comprising:
- selectively percent decoding the input string to convert hexadecimal-encoded characters of the input string into ASCII-encoded characters.

39. The method of claim 24, further comprising:
- selectively removing up-level commands in a pathname provided within the input string.

40. The method of claim 24, further comprising:
- selectively removing duplicate slashes in a pathname provided within the input string.

* * * * *